(12) United States Patent
Strnad et al.

(10) Patent No.: US 8,069,063 B2
(45) Date of Patent: Nov. 29, 2011

(54) SYSTEM AND METHOD FOR MONITORING MULTINATIONAL INSURANCE

(75) Inventors: Martin Strnad, Zurich (CH); Mark Hetherington, Horgen (CH); Andrew Gitsham, Zollikerberg (CH); Jude Buckley, Southampton (GB); Urs Lüthy, Zurich (CH)

(73) Assignee: Zurich Insurance Company (CH)

( * ) Notice: Subject to any disclaimer, the term of this patent is extended or adjusted under 35 U.S.C. 154(b) by 751 days.

(21) Appl. No.: 12/004,820

(22) Filed: Dec. 21, 2007

(65) Prior Publication Data

US 2008/0177601 A1    Jul. 24, 2008

Related U.S. Application Data

(60) Provisional application No. 60/876,381, filed on Dec. 21, 2006.

(51) Int. Cl.
G06Q 40/00    (2006.01)

(52) U.S. Cl. .............................. 705/4; 705/31
(58) Field of Classification Search ........................ 705/4
See application file for complete search history.

(56) References Cited

U.S. PATENT DOCUMENTS

| | | | |
|---|---|---|---|
| 5,479,344 A * | 12/1995 | Keziah, Jr. ....................... 705/4 |
| 2003/0061131 A1* | 3/2003 | Parkan, Jr. ...................... 705/30 |
| 2007/0282761 A1* | 12/2007 | Deputy et al. ............... 705/36 T |

* cited by examiner

Primary Examiner — Ojo O Oyebisi
(74) Attorney, Agent, or Firm — DLA Piper LLP (US)

(57) ABSTRACT

A method for monitoring insurance, which includes steps of storing a plurality of Tax Records in a database, where each Tax Record corresponds to one or more insurance agreements, and permitting the display of at least one of the plurality of Tax Records. The method assists insurers with multinational customers in keeping track of insurance agreements, and ensuring compliance with legal, regulatory and tax requirements across different states, nations or jurisdictions.

16 Claims, 24 Drawing Sheets

Change Log Home Screen

| ☑ Country data | | |
|---|---|---|
| Filter: Countries ✐ 0 selected → | LoB ✐ 0 selected | |

| ☑ Domestic License | | |
|---|---|---|
| Filter: Entities ✐ 0 selected | LoB ✐ 0 selected | |

| ☑ Foreign License | | |
|---|---|---|
| Filter: Entities ✐ 0 selected | Country of Risk ✐ 0 selected | LoB ✐ 0 selected |

| ☑ Entity |
|---|
| Filter: Entities ✐ 0 selected |

Date Range

⦿ last 30 days
○ last 60 days
○ last 90 days
○ Date Range

[ Display result ]

FIG. 11

| Home | By LoB | By country | Multiple countries | Entity data | Country data | Change log | Links | Management view |

Management View

Special search criteria for countries and LoB(s)

From Date: 29/11/2007
LoB(s): 3 selected
Countries: 10 selected

Select Scenarios
- ☑ Business Scenario 1
- ☑ Business Scenario 2
- ☑ Business Scenario 3
- ☑ Business Scenario 4
- ☑ Business Scenario 5

|  | permitted | not permitted | exception |
|---|---|---|---|
|  | ☐ | ☐ | ☐ |
|  | ☐ | ☐ | ☐ |
|  | ☐ | ☐ | ☐ |
|  | ☐ | ☑ | ☐ |

→ Optional Search Filter

Entity Data ☐ ← tick to display all license information

Display result

[expand all] [collapse all] [export all] [print view] [Show Cormis] [Business Scenario] ⓘ

MIA lines of business (Major categories)

| Line of business (sub categories) | Property | | |
|---|---|---|---|
| | Boiler & Machinery | Boiler & Interruption | Material Damage |
| | 🔒 | 🔒 | 🔒 |
| ● Argentina Country Guide | | | |
| ● Companies with HOST license | | | |
| ★ Zurich Argentina Cia. de Seguros S.A. | HOST | HOST | HOST |
| ● Business Scenario 1 | | | |
| Non admitted (OOT) permitted? | No | No | No |
| Non admitted (OOT) tax obligations? | | | |
| Tax rate greater 0%? | | | |
| ● Variations | | | |
| ● Business Scenario 2 | | | |
| DIC/DIL permitted? | No | No | No |
| DIC/DIL tax obligations? | | | |
| Tax rate greater 0%? | | | |
| ● Variations | | | |

Tax Record

| Tax Record | | Search tax record >> | Home >> |
|---|---|---|---|
| Tax record id | 2314 | Tax record status | Bound |
| Entity country [1] | United Kingdom | | |
| Legal entity [1] | ZIIL UK | Country of risk [1] | (?) Philippines |
| Business Unit | Global Corporate | Tax reported currency | Philippines, Pesos |
| Local contract id [1] | 704591 | | |
| Program id | 141602 | Location name | |
| Producing Country | United Kingdom | Street number | |
| Producing Entity | ZIIL UK | Street name | |
| IPS contract id | PR6636C | Town / City | |
| Customer [1] | Sports Direct | Postal code | |
| Period from [1] | 01/05/2007 | Country / State | Philippines |
| Period to [1] | 30/04/2008 | Contract currency [2] | United Kingdom, Pounds |
| LOB [1] | Material Damage | Signed share less 100% [2] | |
| FOS [1] | no | Net premium [2] | (?) 2,120.24 |
| Business scenario [1] | Business Scenario 2 | Gross net premium [2] | (?) 2,120.24 |
| Record Type [2] | Renewal | Gross premium [2] | (?) 2,431.91 |
| Underwriter name [1] | Brett Short | Date of receipt of premium | |
| Email address | brett.1.short@uk.zurich.com | Installment ind. [2] | no |
| Telephone number | 00 44 023 9285 4941 | No of installments | |
| Underwriter user id | GBQSN4 | Type [2] | Sums Insured |
| Exception considered? | | Element value [2] | 150,000,000 |
| 1 = Fields required for status Pending | | | |
| 2 = Fields required for status Bound | | | |

| Tax Record | | | | |
|---|---|---|---|---|
| Tax Record | | | Search tax record >> | Home>> |
| Tax record id | 2314 | Tax record status | Bound | |
| Entity country [1] | United Kingdom | | | |
| Legal entity [1] | ZIIL UK | Country of risk [1] | Philippines | |
| Business Unit | Global Corporate | Tax reported currency | Philippines, Pesos | |
| Local contract id [1] | 704591 | | | |
| Program id | 141602 | Location name | | |
| Producing Country | United Kingdom | Street number | | |
| Producing Entity | ZIIL UK | Street name | | |
| IPS contract id | PR63335C | Town / City | | |
| Customer [1] | Sports Direct | Postal code | | |
| Period from [1] | 01/05/2007 | Country / State | Philippines | |
| Period to [1] | 30/04/2008 | Contract currency [2] | United Kingdom, Pounds | |
| LOB [1] | Material Damage | Signed share less 100% [2] | | |
| FOS [1] | no | Net premium [2] | 2,120.24 | |
| Business scenario [1] | Business Scenario 2 | Gross net premium [2] | 2,120.24 | |
| Record Type [2] | Renewal | Gross premium [2] | 2,431.91 | |
| Underwriter name [1] | Brett Short | Date of receipt of premium | | |
| Email address | brett.t.short@uk.zurich.com | Installment ind. [2] | no | |
| Telephone number | 00 44 023 9265 4941 | No of installments | | |
| Underwriter user id | GBQSN4 | Type [2] | Sums Insured | |
| Exception considered? | | Element value [2] | 150,000,000 | |

[1] = Fields required for status Pending
[2] = Fields required for status Bound

[Edit]
[Copy Tax record] [Copy Installment] [Delete Tax record] [Print]

| Tax Posting | | | | | | | | | | | | |
|---|---|---|---|---|---|---|---|---|---|---|---|---|
| Tax posting id | Tax posting status | Tax type | Accounting model | Tax rate % | Tax amount in Contract currency | Exchange rate | Tax amount in Tax reported currency | Reversal link id | Reversal reason | Date of notification to Tax rep. | Tax report month | Tax report year |
| 2851 | Bound | Stamp Duty on Property & Casualty Insurance | Cash received | 12.50 | 265.03 | | 2,120.24 | | | | | |
| 2852 | Bound | Premium Tax (Personal accident) | Cash received | 20 | 4.24 | | 2,120.24 | | | | | |
| 2853 | Bound | Fire Services Levy on Propert insurance | Cash received | 2.00 | 42.40 | | 2,431.91 | | | | | |

| Tax Record | | | Search tax record >> Home >> |
|---|---|---|---|
| Tax record id | 0 | Tax record status | Pending ▼ / Bound / Pending |
| Entity country [1] | ▼ | | |
| Legal entity [1] | ▼ | Country of risk [1] | |
| Business Unit | ▼ | Tax reported currency | ▼ |
| Local contract id [1] | | | |
| Program id | | Location name | |
| Producing Country | ▼ | Street number | |
| Producing Entity | ▼ | Street name | |
| IPS contract id | | Town / City | |
| Customer [1] | | Postal code | |
| Period from [1] | 20/09/2007 | Country / State | |
| Period to [1] | | Contract currency [2] | ▼ |
| LOB [1] | ▼ | Signed share less 100% [2] | ○ yes  ○ no |
| FOS [1] | ○ yes  ⊙ no | Net premium [2] | ⓘ |
| Business scenario [1] | ▼ | Gross net premium [2] | ⓘ |
| Record Type [2] | ▼ | Gross premium [2] | ⓘ |
| Underwriter name [1] | 🔍 | Date of receipt of premium | |
| Email address | | Installment ind. [2] | ○ yes  ⊙ no |
| Telephone number | | No of installments | |
| Underwriter user id | | Type [2] | ▼ |
| Exception considered? | ○ yes  ○ no | Element value [2] | |

1 = Fields required for status Pending
2 = Fields required for status Bound

[ Save ]   [ Cancel ]                                    [Print]

FIG.19

| Home | Basic search | Advanced search | New tax record | UWR information | Links | Administration |

Underwriter information

Search underwriter | Search>> | Home >>

- Underwriter user id (UAS)
- Country
- Underwriter name
- Email address
- Telephone number
- Fax number
- Company Save

SYSTEM AND METHOD FOR MONITORING MULTINATIONAL INSURANCE

CROSS REFERENCE TO RELATED APPLICATIONS

This application claims priority to U.S. Provisional Patent Application No. 60/876,381, filed Dec. 21, 2006, the entire contents of which are incorporated by reference, as if fully set forth herein.

FIELD OF THE INVENTION

This present invention relates to the field of insurance, and more particularly to a system and method for monitoring insurance policies across multiple states, nations or jurisdictions.

BACKGROUND OF THE INVENTION

Many insurance companies have customers with bases of operation in more than one U.S. state, and in many cases in more than one national country. Because of the legal, regulatory and tax differences between different states, nations and jurisdictions, most insurance companies underwrite policies from a particular location, to a Policyholder (i.e., First Named Insured) in that same location. For example, an insurance company based in Pennsylvania would only underwrite insurance to Pennsylvania residents or entities. However, in some cases, insurance companies in one state, nation or jurisdiction underwrite insurance providing coverage to risk exposures pertaining to that same Policyholder (or a different Policyholder) located in another state, nation or jurisdiction. Examples may be states, nations or jurisdictions, where there are registered subsidiaries of the Policyholder, or where the Policyholder has property, representative offices, registered directors and officers, etc. In such cases, the insurance companies must ensure to act in accordance with the legal, regulatory and tax requirements for such other state, nation or jurisdiction. Such business practice is also known as Cross Border (CB) or Out Of Territory (OOT) coverage. When policies number in the thousands, and states, nations and jurisdictions in the hundreds, keeping track of all the different legal, regulatory and tax requirements can be cumbersome.

Additionally, some states, nations and jurisdictions place significant restrictions on 'non-admitted' or Out Of Territory (OOT) insurance companies, and in some cases do not permit such companies to insure risks or exposures located in their territories. For example under certain conditions and at the time being, Brazil, China, Japan, the Russian Federation, Switzerland, India, Malaysia, Mexico, Turkey, Thailand and Hong Kong all place significant restrictions on OOT insurance companies, irrespective of the place, where the insurance contract is negotiated. For example, if an US-based insurer is providing insurance coverage to a customer's premises or other exposure which is physically located in Switzerland, then, the US-based insurer is not permitted to do so without obtaining the proper authorization (license) from the Swiss insurance regulator (i.e., the Swiss Federal Office of Private Insurance (FOPI)), irrespective of the fact that this insurance coverage probably is negotiated and underwritten outside of Switzerland, in the US.

Accordingly, there is presently a need for a system and method for monitoring multinational insurance which allows insurance policies to be efficiently issued across different states, nations and jurisdictions, and which ensures compliance with legal, regulatory and tax requirements across different states, nations or jurisdictions.

SUMMARY OF THE INVENTION

An exemplary embodiment of the present invention comprises a method for monitoring insurance, including the steps of storing a plurality of tax records in a database, each tax record corresponding to one or more insurance agreements, and permitting the display of at least one of the plurality of tax records.

Another exemplary embodiment of the present invention comprises a computer system including at least one server computer and at least one first client computer coupled to the at least one server computer through a network, wherein the at least one server computer includes at least one program stored thereon, the at least one program performing the steps of storing a plurality of tax records in a database, each tax record corresponding to one or more insurance agreements, and, permitting the display of at least one of the plurality of tax records.

Another exemplary embodiment of the present invention comprises a computer readable medium having embodied therein a computer program for processing by a machine, the computer program including a first code segment for permitting the storage of a plurality of tax records in a database, each tax record corresponding to one or more insurance agreements, and a second code segment for permitting the display of at least one of the plurality of tax records.

Another exemplary embodiment of the present invention comprises a method for sharing insurance information over a computer network including the steps of allowing at least one user to store insurance information in a computer database coupled to the network, and providing at least one user the ability to view the insurance information from a computer coupled to the network.

BRIEF DESCRIPTION OF THE DRAWINGS

FIG. 8 is a screen shot showing a Entity Data Home Screen (also referred to as Entity Data View) according to a first exemplary embodiment of the present invention.

FIG. 9 is a screen shot showing a Country Data Home Screen (also referred to as Country Data View) according to a first exemplary embodiment of the present invention.

FIG. 11 is a screen shot showing a Change Log Home Screen according to a first exemplary embodiment of the present invention.

FIG. 12 is a screen shot showing a Management Home Screen according to a first exemplary embodiment of the present invention.

FIG. 13 is a screen shot showing a Tax Home Screen according to a first exemplary embodiment of the present invention.

FIG. 16 is a screen shot showing a Tax Record Screen according to a first exemplary embodiment of the present invention.

FIG. 17 is a screen shot showing a Tax Record Screen with a Tax Posting according to a first exemplary embodiment of the present invention.

FIG. 19 is a screen shot showing a Tax Record Entry Screen according to a first exemplary embodiment of the present invention.

FIG. 20 is a screen shot showing an Underwriter Screen according to a first exemplary embodiment of the present invention.

FIG. 23 is a screen shot showing a Tax Report Home Screen according to a first exemplary embodiment of the present invention.

DETAILED DESCRIPTION

Figure 1:
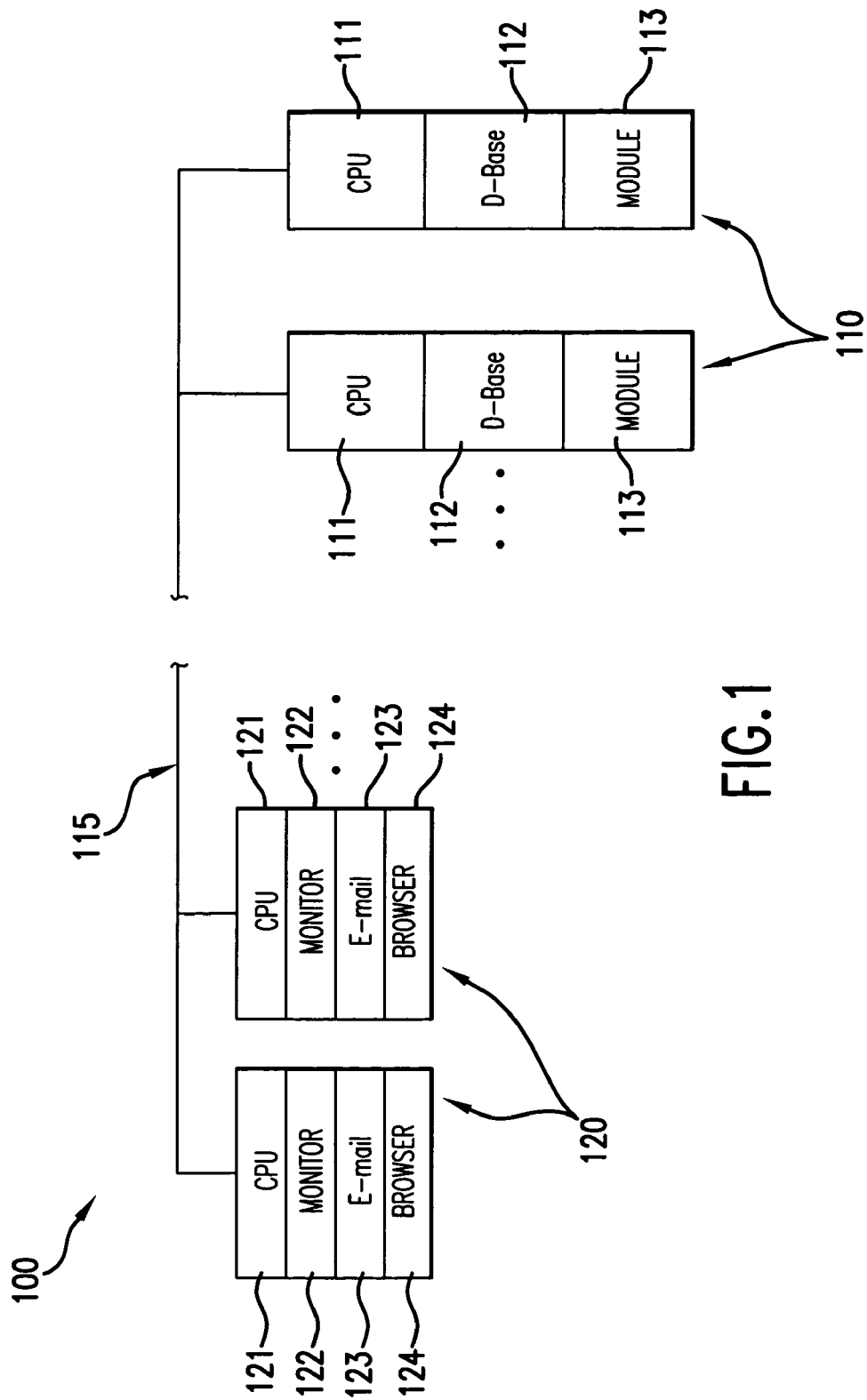
FIG. 1 is block diagram showing a computer system according to an exemplary embodiment of the present invention.

The present invention comprises, in a first exemplary embodiment, a system and method for issuing insurance which permits the various employees of an insurer to share and access vital information across different states, nations and jurisdictions. More precisely, the system and method assists the an insurer in: (i) monitoring legal and regulatory requirements for the provision of multinational insurance business, as well as associated insurance premium tax duties triggered by such insurance business in worldwide jurisdictions and, (ii) providing efficient means to remit such taxes worldwide by the correct insurer (or its tax representative) to the competent tax authority in any worldwide jurisdiction. It will be appreciated that the following description is intended to refer to exemplary embodiments of the present invention selected for illustration in the drawings, and such exemplary embodiments are not intended to define or limit the present invention.

The following terms are relevant to the foregoing discussion, and will be briefly explained at the outset:

Master Policy—an insurance agreement between an insurer (and possibly co-insurers) and an insured which covers the Policyholder's risks, exposures or other insurable interests in multiple states, nations or jurisdictions.

Local Policy—an insurance agreement between a local insurer (which is either a related company of the insurer, or appointed thereby) and an insured's local subsidiary.

European Economic Area (EEA)—A group created by the European Union (EU) and the European Free Trade Association (EFTA), whose members include all member states of the EU and EFTA. The EEA is a coalition of European countries presently comprised of the following: Austria, Belgium, Bulgaria, Cyprus, Czech Republic, Denmark, Estonia, Finland, France, Germany, Greece, Hungary, Ireland, Italy, Latvia, Lithuania, Luxembourg, Malta, Netherlands, Poland, Portugal, Romania, Slovakia, Slovenia, Spain, Sweden, United Kingdom, Iceland, Liechtenstein and Norway.

Difference in Conditions (DIC)—a provision under a Master Policy which covers the difference in definitions, perils, conditions or coverage between any Local Policy and the Master Policy, provided that the coverage is provided for under the Master Policy.

Difference in Limits (DIL)—a provision under a Master Policy which covers the difference between the respective limit of liability stated in any Local Policy and the Master Policy, provided that the coverage is provided for under the Master Policy.

FOS Master Policy—FOS stands for Freedom of Services, which was established within the EEA in order to allow EEA registered service providers to offer and conduct their services without restrictions across the EEA. An FOS Master Policy is an insurance agreement between an EEA-licensed insurer (and possibly co-insurers) and a Policyholder which has risks, exposures and/or other insurable interests located in different countries throughout the EEA. The FOS Master Policy may be used to complement a Master Policy issued by non-EEA licensed insurer, in order to cover the risks located in these countries with one document or agreement, instead of issuing local insurance policies in all the EEA member countries. The FOS Master Policy provides the Policyholder with a single agreement covering risk exposures within the EEA comprehensively.

FOS Integrated Master Policy—the same as an FOS Master Policy except that in this instance, the Policyholder also has local insurance policies in certain EEA countries which are 'integrated' with the FOS Master Policy. The FOS Integrated Master Policy provides DIC/DIL or Excess coverage in the event of any shortfall between the FOS Master Policy and any Local Policies.

Stacking—the accumulation of limits (as between Master, Local and FOS Master Policies) within the same line of business.

Primary Coverage—insurance coverage that is provided up until a certain overall limit is reached.

Excess Coverage—insurance coverage that is provided over and above Primary Coverage.

Excess Policy—an insurance agreement providing for Excess Coverage.

First Named Insured—alternative title for Policyholder.

Policyholder—a contracting party to a Master Policy. The Policyholder normally is the parent or holding company of the insured multinational customer. The Policyholder often purchases the insurance coverage for its international subsidiaries and affiliates located worldwide. The method for underwriting multinational insurance explained below permits the insurer to insure the Policyholder (and any of its subsidiaries and affiliates) in states, jurisdictions and nations where the insurer is permitted to do so, through a Master Policy. Where the insurer is not permitted to do so, the method offers a number of alternative methods (e.g. Local Policies, FOS, etc.).

FIG. 1 shows an exemplary client-server computer system 100 which may be utilized to carry out a method according to a first exemplary embodiment of the present invention. The computer system 100 includes a plurality of server computers 110 and a plurality of user computers 120 (clients). The server computers 110 and the user computers 120 may be connected by a network 115, such as for example, an Intranet or the Internet. The user computers 120 may be connected to the network 115 by a dial-up modem connection, a Local Area Network (LAN), a Wide Area Network (WAN), cable modem, digital subscriber line (DSL), Wi-Fi, or other equivalent connection means (whether wired or wireless).

Each user computer 120 preferably includes a central processing unit (CPU) 121, and a video monitor 122 for displaying information. Additionally, each user computer 120 preferably includes an electronic mail (e-mail) program 123 (e.g., Microsoft Outlooks, Yahoo!Mail, or the like) and a browser program 124 (e.g. Microsoft Internet Explorer®, Netscape Navigator®, Internet Safari®, etc.), as is well known in the art.

One or more of the server computers 110 preferably includes at least one program module 113 which allows each of the user computers 120 to communicate with the server computer 110, and each other, over the network 115. Preferably, one or more of the servers computers include multiple program module 113, which permit the performance of various functions as between the server computers 110 and the user computers 120. These program modules 113 may include program code, preferably written in Hypertext Markup Language (HTML), JAVA™ (Sun Microsystems, Inc.), Active Server Pages (ASP), Extensible Markup Language (XML), and/or any other such software language known to those of ordinary skill in the art. Additionally, the program modules should permit access to their contents and functions when users at the user computers 120 provide certain information to the respective browser programs 124. For example, one program module 113 may be accessed simply by entering a specific web address (i.e., Uniform Resource Locator (URL) address), and other program module may include security measures which permit access to the program module once certain criteria of the user have been met, or when certain information (e.g., a password) is entered by the user at the user computer 120.

One or more of the server computers 110 may also include a database 112 for storing: (1) information utilized by the program modules 113, (2) information transmitted to the server computer 110 by one or more of the user computers 120, and/or (3) information transmitted to the user computers 120 by one or more of the server computers 110. For example, in one exemplary embodiment of the present invention the database 112 may include information regarding lines of business (e.g., Material Damage, Accident, etc.), countries, legal matters, etc. Although the database 112 is shown in FIG. 1 as being internal to the server 110, those of ordinary skill in the art will realize that the database 112 may alternatively comprise an external database. Additionally, although database 112 is shown as a single database in FIG. 1, those of ordinary skill in the art will realize that the present computer system 100 may include one or more separate databases coupled to the network 115, and accessible by either of the server computers 110 or user computers 120.

Figure 2:
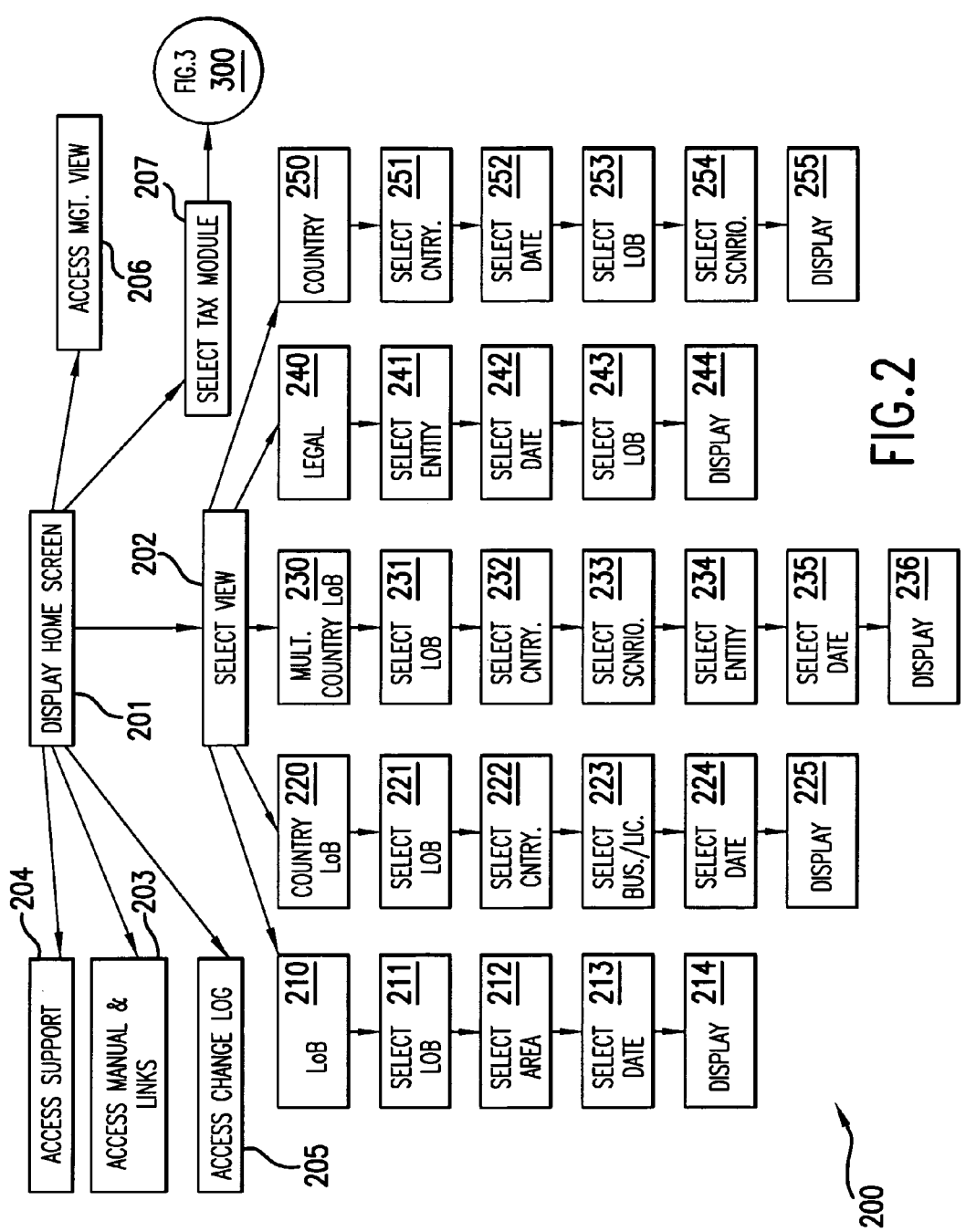
FIG. 2 is a flow chart showing a method for monitoring insurance according to a first exemplary embodiment of the invention.

FIG. 2 shows a method for monitoring insurance 200 which may be implemented as software and saved on one or more of the program modules 113 of the server computers 110, or in any other location known to those of ordinary skill in the art. For ease of reference, the method 200 is described herein as being performed on a machine, however, those of ordinary skill in the art will realize that the present invention is not so limited. Optionally, the method 200 may be implemented manually, and those of ordinary skill in the art will understand how to translate the foregoing computer-implemented steps into manually-implemented steps.

The method 200 may be implemented to assist in the issuance and monitoring of insurance policies which cover multiple states, nations and/or jurisdictions. For ease of reference, the exemplary embodiment is directed to a method for monitoring insurance across multiple countries. When an insurance agreement includes an insurer and an insured disposed in different countries (and sometimes in multiple different countries), certain scenarios must be addressed. For example, both the insurer and the insured may incur tax liabilities in each country where the insurance coverage exists, and possibly in each country where the insurer or insured have offices. Typically, the insurer meets these obligations by disbursing all insurer tax payments, and passing the expense on to the insured. In order to keep track of such tax obligations and payments, the method 300 (explained below) permits the insurer to create and modify Tax Records, which may be accessed virtually worldwide by the insured's representatives over the Internet, or an Intranet.

For ease of operation, users of the above-referenced method 200 may be assigned into one of six (6) categories. Those categories may include, but are not limited to, (1) Underwriter, (2) Accountant, (3) Tax Responsible, (4) Tax Representative, (5) Webi User, and (6) UAS Application Administrator. User registration and assignment of categories to users may be handled by an International Program Business (IPB) Coordinator. The IPB Coordinator is mainly responsible for supporting business and business applications as they relate to the issuance and maintenance of insurance according to the method 200, and the method 300 explained below. In the exemplary embodiment, only the Underwriter, Tax Responsible, and Tax Representative users will have access to the Tax Module and the method 300, and thus access to the Tax Records and Tax Postings (explained in detail below). The Underwriter user may have access to search Tax Records, create Tax Records, update Tax Records, copy Tax Records, delete Tax Records, make Tax Postings, and reverse Tax Postings. The Tax Responsible and Tax Representative users may have access to search tax and view Tax Records, but not alter the records in any way. The Accountant user may have access to search Tax Records, and record receipt of premiums (through Tax Postings, as explained below), but similarly no ability to alter the records in any way. The Webi user may have access to tax reports, but no ability to search, view or edit Tax Records. Finally, the UAS Application Administrator may have access to assign the above-referenced categories to different users, but no ability to search, view or edit Tax Records. The roles of each of these users will be apparent from the foregoing discussion.

Figure 4:
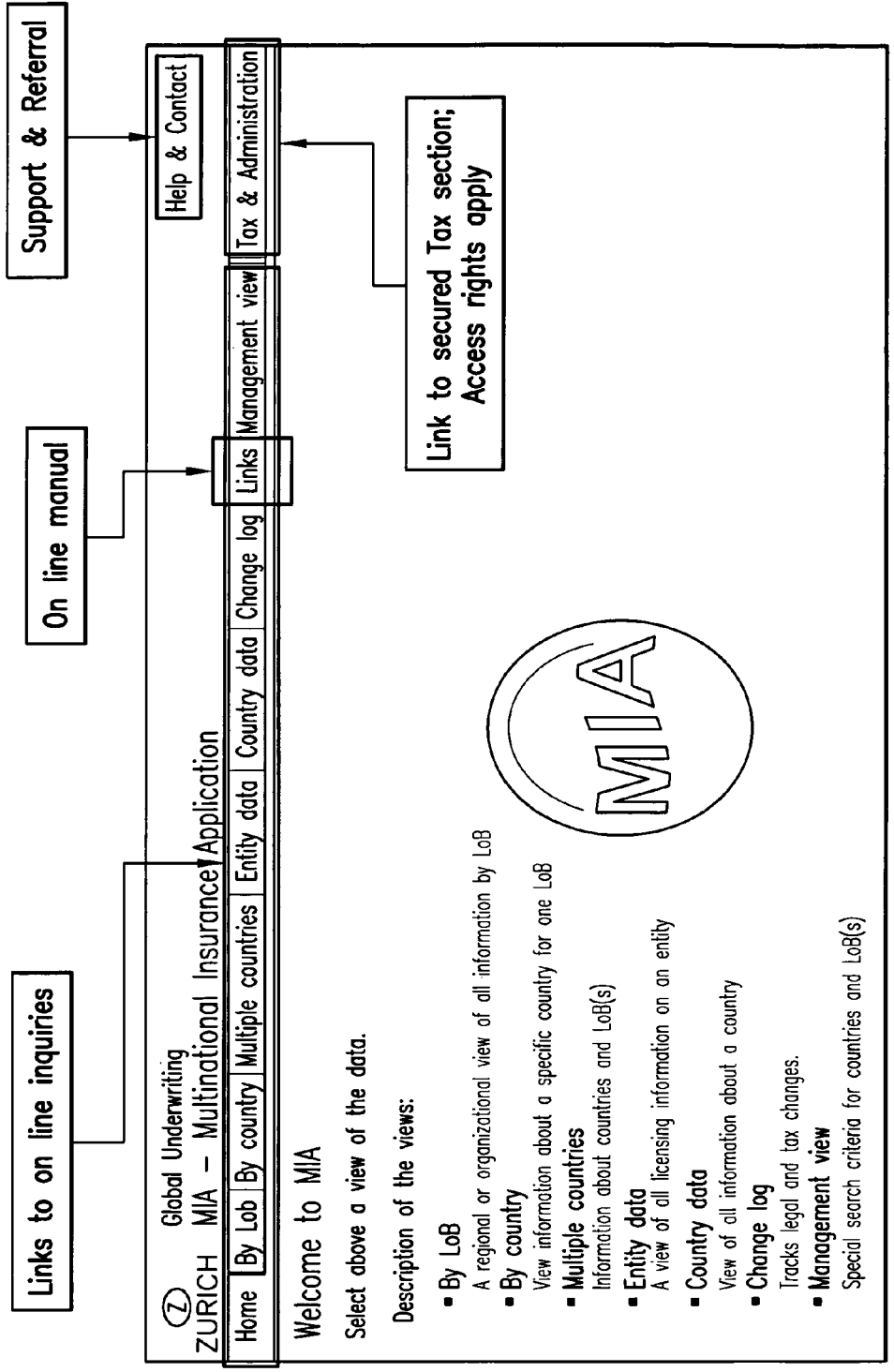
FIG. 4 is a screen shot showing a Home Screen according to a first exemplary embodiment of the present invention.

The method for monitoring insurance 200 preferably includes a first step of logging on to a specific website by, for example, entering a specific URL (e.g., http://mia.zurich.com/) in one of the browser programs 124 of one of the user computers 120 so that a Home Screen (See FIG. 4) is displayed (step 201). From the Home Screen, the user may select a 'View' (step 202). The available Views are: (1) Line of Business (LoB), (2) Country LoB, (3) Multiple Country LoB, (4) Entity Data, and (5) Country Data. The LoB View allows the user to view information according to an entity's specific line of business. For example, if the insured entity is a multinational company, the LoB View allows the user to view a regional or organizational view of all information by LoB (e.g., Material Damage coverage), and what types of insurance they are permitted to underwrite in each country. The Country LoB View allows the user to view information for a specific country for one line of business. For example, if the entity is a multinational insurance company, the Country LoB View allows the user to view all entities which are permitted, for any specific LoB (e.g., Material Damage coverage), to underwrite insurance regarding risks that are located in the selected country. The Multiple Country LoB View allows the user to view information for multiple countries and multiple line of businesses. For example, the Multiple Country LoB View allows the user to view all country data for a particular LoB (e.g., Property Material Damage coverage). The Entity Data View allows the user to view all licensing information on an entity (i.e., what licenses or other authorizations any legal entity, subsidiary, affiliated company or branch of the insurer's worldwide group of companies is holding, and for what LoB in any specific state, country, nation or jurisdiction such licenses or other authorizations do apply). For example, if the insured is a multinational company, the Entity Data View allows the user to view all relevant information for a specific legal entity, subsidiary, affiliated company or branch of the insurer's worldwide group of companies, including what types of policies they are permitted to underwrite in any specific state, country, nation or jurisdiction, where the insured Policyholder has any insured risk located. Finally, the Country Data View allows a user to view all of the insurance information for specific country. For example, the Country Data View allows the user to view all insurance information about a particular country, including what types of policies may be underwritten. From the Home Screen, the user can (instead of selecting a 'View'): (1) access important documents and links, such as an on-line manual (Step 203), (2) access help and support information (Step 204), (3) view a Change Log (Step 205), (4) enter a Management View (Step 206), or (5) access a Tax Module (Step 207), which will be explained in more detail below.

Various LoBs are contemplated to be within the scope of the exemplary embodiment of the present invention. For example, such LoBs may include, but are not limited to: (1) Property, (2) Marine, Aviation & Transport, (3) Liability, (4) Financial Lines, (5) Motor, (6) Accident & Health, (7) Credit, Surety & Fidelity, (8) Worker's Compensation, (9) Automobile Assistance, (10) Crop, (11) Legal Indemnity, (12) Travel and (13) Warranty. Each of the above LoBs may also optionally include various sub-categories. For example, the Property LoB may include sub-categories for (1) Material Damage, (2) Business Interruption and (3) Boiler & Machinery.

Figure 5:
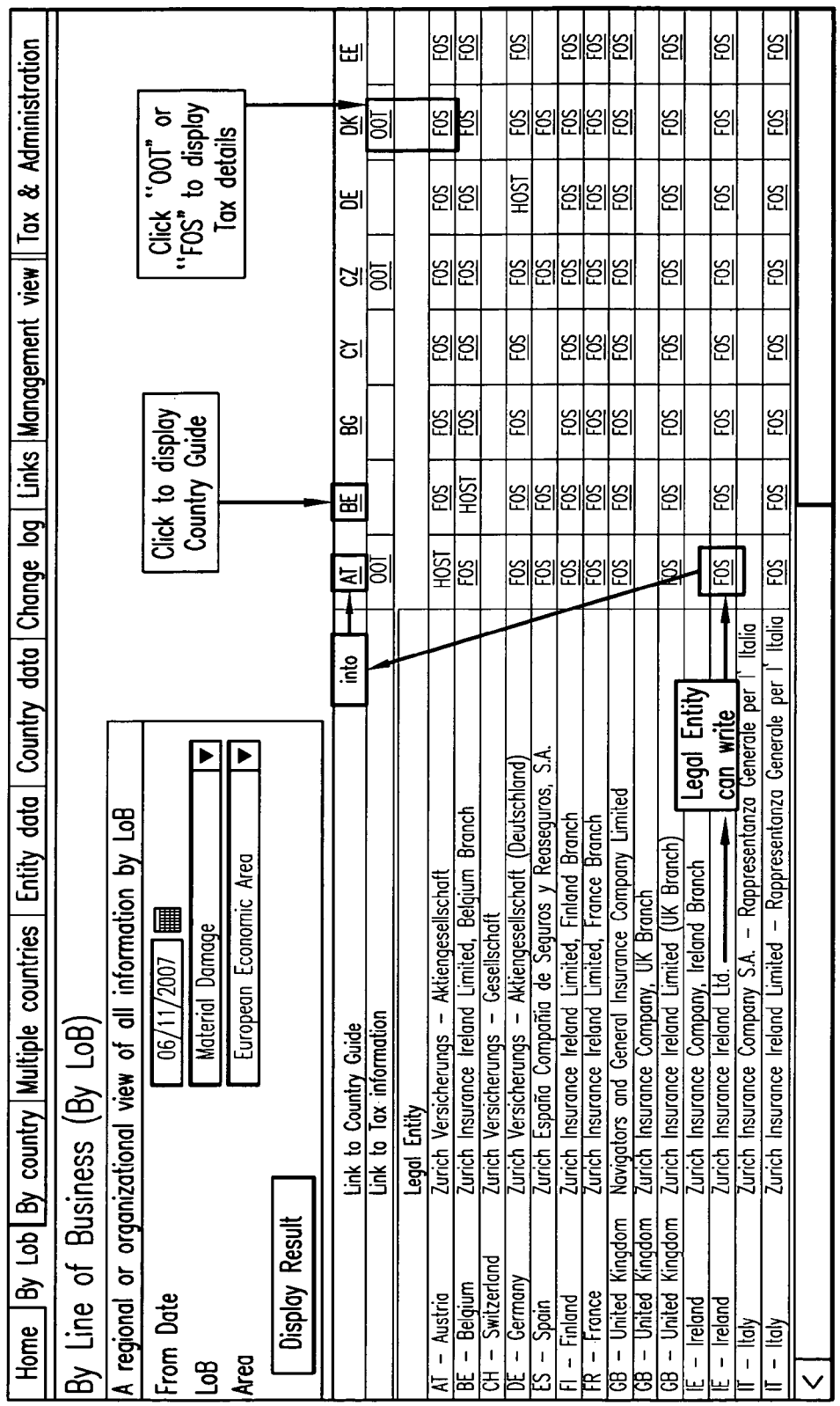
FIG. 5 is a screen shot showing a LoB Home Screen (also referred to as LoB View) according to a first exemplary embodiment of the present invention.

If the user selects LoB View (at Step 202), the method proceeds to display a LoB Home Screen (Step 210) (See FIG. 5). From the LoB Home Screen, the user can select any line of business in the database (e.g., database 112), from a 'drop-down' menu or other such means (Step 211), then select an area (Step 212), then select a date (Step 213), and then select a command button (which may be titled "Display Results") to display the information for that line of business, area and date range (Step 214). The displayed results may additionally include one or more command buttons or hyperlinks which, when activated, display country information (e.g., the country hyperlinks (AT, BE, CY, etc.)) and/or tax information (e.g., the policy hyperlinks "FOS," "OOT," etc.). For example, the hyperlink "FOS" in FIG. 5 displays the detailed tax information when an insurance policy is written within the European Economic Area (EEA) under Freedom of Services (FOS) rules.

As shown in FIG. 5, the LoB Home Screen shows each entity (e.g., insurer) for a particular line of business (e.g., Material Damage), and the types of policies (e.g., a policy written under the Freedom of Services (FOS) rules of the EEA), that may be underwritten by that entity on a per country basis. For example, there may be an entity called "Zurich Insurance Ireland Limited" which is based in Belgium, and which can issue FOS policies in Austria, Belgium, etc. It will be noted that the term "HOST" appears in the country column to designate that the country issuing the insurance (e.g., BE) and the country in which the insurance will be placed (e.g., BE) are the same. The user may continue the above-referenced selection process for any number of different lines of business, navigate to another 'View' type (Step 202), access important documents and links, such as an on-line manual (Step 203), access help and support information (Step 204), view a Change Log (Step 205), enter a Management View (Step 206), or access the Tax Module (Step 207).

Figure 6:
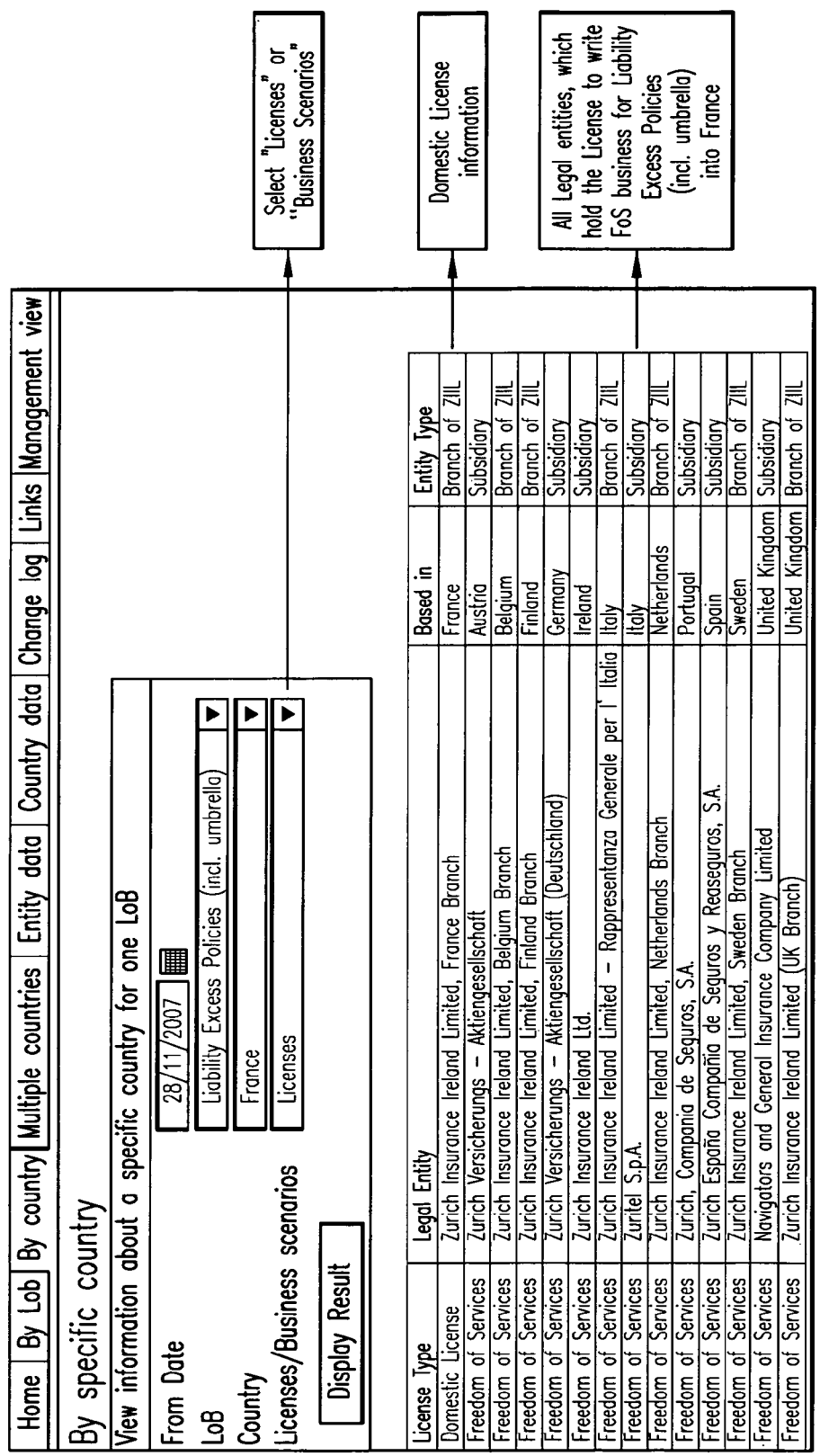
FIG. 6 is a screen shot showing a Country LoB Home Screen (also referred to as Country LoB View) according to a first exemplary embodiment of the present invention.

If the user selects Country LoB View (at Step 202), the method proceeds to display a Country LoB Home Screen (Step 220) (See FIG. 6). From the Country LoB Home Screen, the user can select any line of business in the database (e.g., database 112), from a 'drop-down' menu or other such means (Step 221), then select a country (Step 222), then select either a 'License' or 'Business Scenario' view option (Step 223), then select a date (Step 224), and then select a command button to display the information for that line of business, country, 'License' and/or 'Business Scenario,' and date range (Step 225). 'Licenses' may include types of insurance agreements, such as Domestic, FOS, etc. 'Business Scenarios' may include situations such as: (1) OOT coverage through a parent company/Policyholder, (2) DIC/DIL coverage through a parent company/Policyholder, (3) Excess coverage through a parent company/Policyholder, (4) Master policy coverage with no local entity, and (5) Master policy coverage with local entity, and variations thereof. FIG. 6 shows a display where the user has selected the 'License' view option, and so the display includes a column which describes the license type. In FIG. 6, all the licenses are either "Domestic" or "Freedom of Services." Both the 'Licenses' and 'Business Scenarios' are preferably generated by the insurer to assist the insurer in identifying recurring insurance scenarios. Those of ordinary skill in the art will realize that the above-referenced Licenses and Business Scenarios are only exemplary, and any insurance coverage scenario may be assigned a License or Business Scenario within the scope of the present invention.

As shown in FIG. 6, the Country LoB Home Screen shows each entity (e.g., insurer) that may underwrite insurance for a particular line of business (e.g., Material Damage) and a particular coverage (e.g., a policy written under the EEA Freedom of Services (FOS) rules). For example, as shown in FIG. 6, the insurer "Zurich Insurance Ireland Ltd." may write Liability Excess insurance for an insured in France under FOS rules. The user may continue the above-referenced selection process for any number of different lines of business, navigate to another 'View' type (Step 202), access important documents and links, such as an on-line manual (Step 203), access help and support information (Step 204), view a Change Log (Step 205), enter a Management View (Step 206), or access the Tax Module (Step 207).

Figure 7:
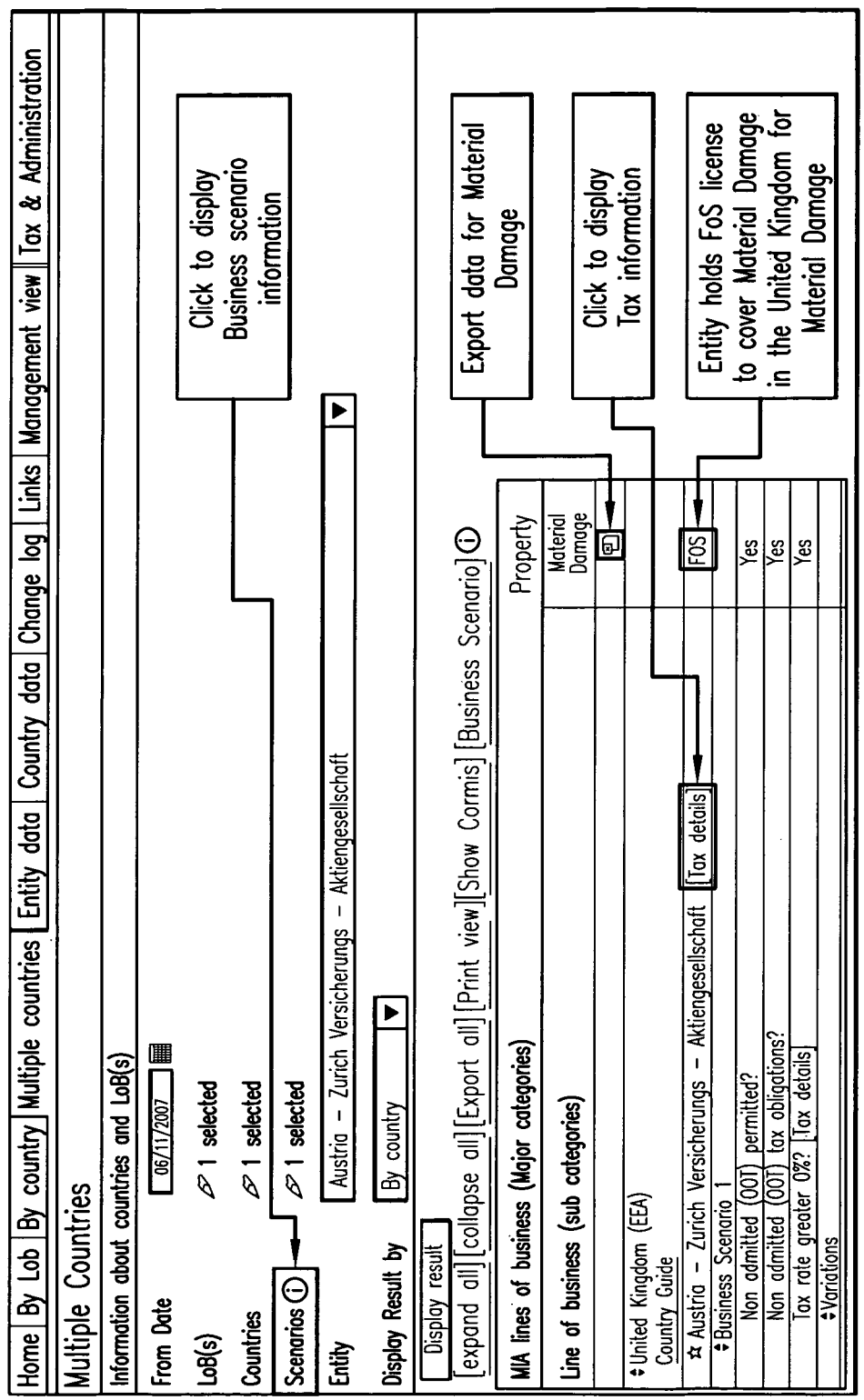
FIG. 7 is a screen shot showing a Multiple Country LoB Home Screen (also referred to as Multiple Country LoB View) according to a first exemplary embodiment of the present invention.

If the user selects Multiple Country LoB View (at Step 202), the method proceeds to display a Multiple Country LoB Home Screen (Step 230) (See FIG. 7). From the Multiple Country LoB Home Screen, the user can select any line of business in the database (e.g., database 112), from a 'drop-down' menu or other such means (Step 231), then select one or more countries (Step 232), then select from one or more Business Scenarios, as discussed above (Step 233), then select an entity (Step 234), then select a date (Step 235), and then select a command button (e.g., "Display result") to display the information for that line of businesses, countries, search criteria, and date range (Step 236), including, but not limited to, Premium and Claims payments, Risk Engineering and Loss Adjustment Activities. The displayed results may also include one or more hyperlinks (e.g., "expand all," "collapse all," "export all," "print view," "show cormis," "business scenario") which, when activated display or hide information related to the results, and/or permit the formatting of the results for printing or downloading.

As shown in FIG. 7, the Multiple Country LoB Home Screen shows each entity (e.g., insurer) for a particular line of business (e.g., Liability Primary Products), and the types of policies (e.g., a policy written under the EEA Freedom of Service (FOS) rules), that may be underwritten by that entity on a per country basis. For example, FIG. 7 shows that the insurer "Zurich Versicherungs-Aktiengesellschaft" can write Material Damage insurance into the United Kingdom under FOS rules. The user may continue the above-referenced selection process for any number of different lines of business, navigate to another 'View' type (Step 202), access important documents and links, such as an on-line manual (Step 203), access help and support information (Step 204), view a Change Log (Step 205), enter a Management View (Step 206), or access the Tax Module (Step 207).

Figure 8:
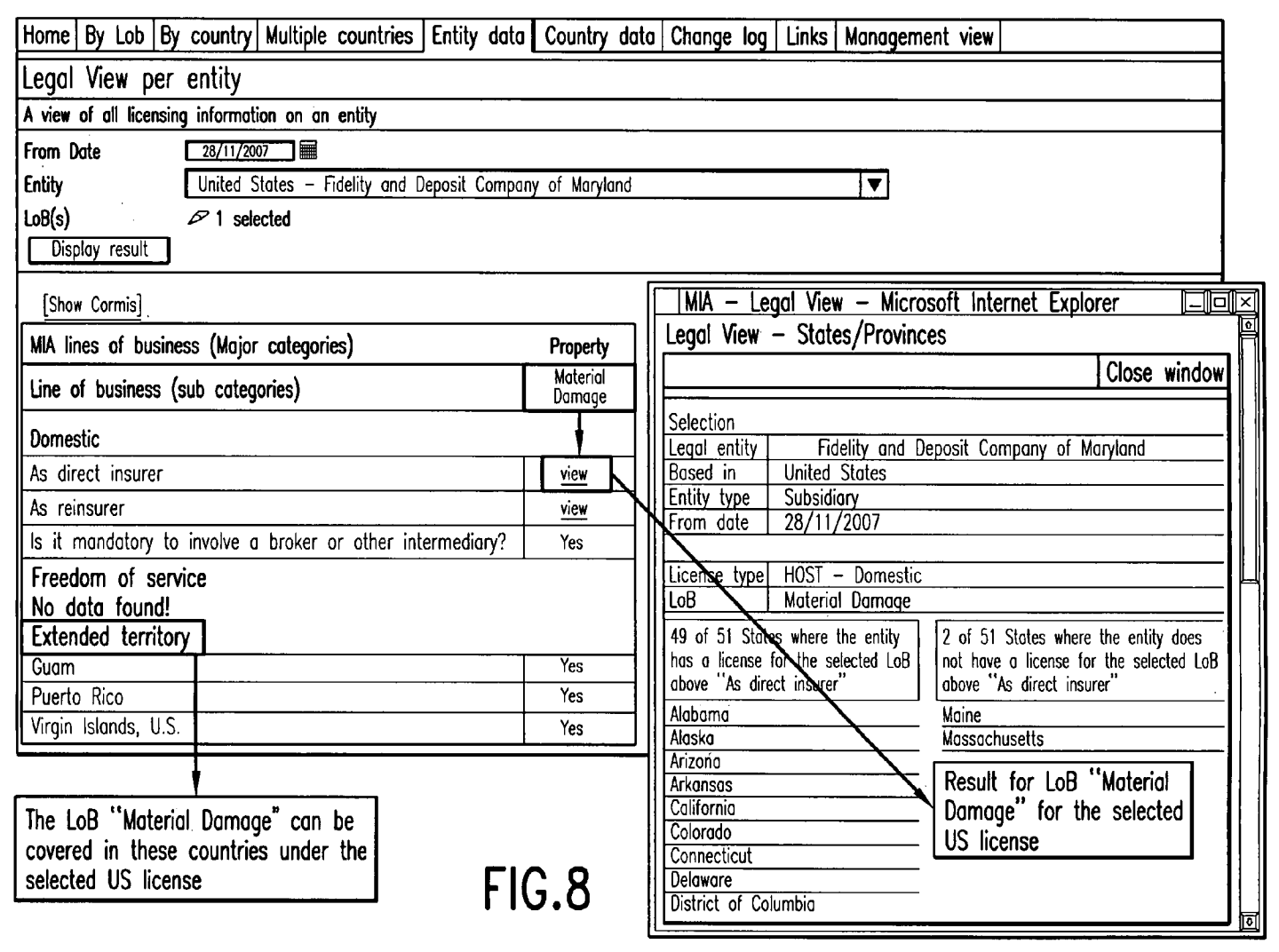

If the user selects Entity Data View (at Step 202), the method proceeds to display an Entity Data Home Screen (Step 240) (See FIG. 8). From the Entity Data Home Screen, the user can select any entity in the database (e.g., database 112), from a 'drop-down' menu or other such means (Step 241), then select a date (Step 242), then select one or more line of business (Step 243), and then select a command button (e.g., "Display result") to display the information for that entity, line of businesses and date range (Step 244). The displayed results may also include one or more hyperlinks which, when activated, open new windows with additional information (e.g., such as the smaller window shown to the right in FIG. 8). As shown in FIG. 8, the Entity Data Home Screen shows all relevant information for a particular entity (e.g., insurer), including the lines of business for the entity (e.g., Material Damage, Business Interruption, etc.). As also shown in FIG. 8, when the 'View' hyperlink in the 'Material Damage' line of business column is activated, a separate window is presented which includes additional information about that line of business. The user may continue the above-referenced selection process for any number of different lines of business, navigate to another 'View' type (Step 202), access important documents and links, such as an on-line manual (Step 203), access help and support information (Step 204), view a Change Log (Step 205), enter a Management View (Step 206), or access the Tax Module (Step 207).

Figure 9:
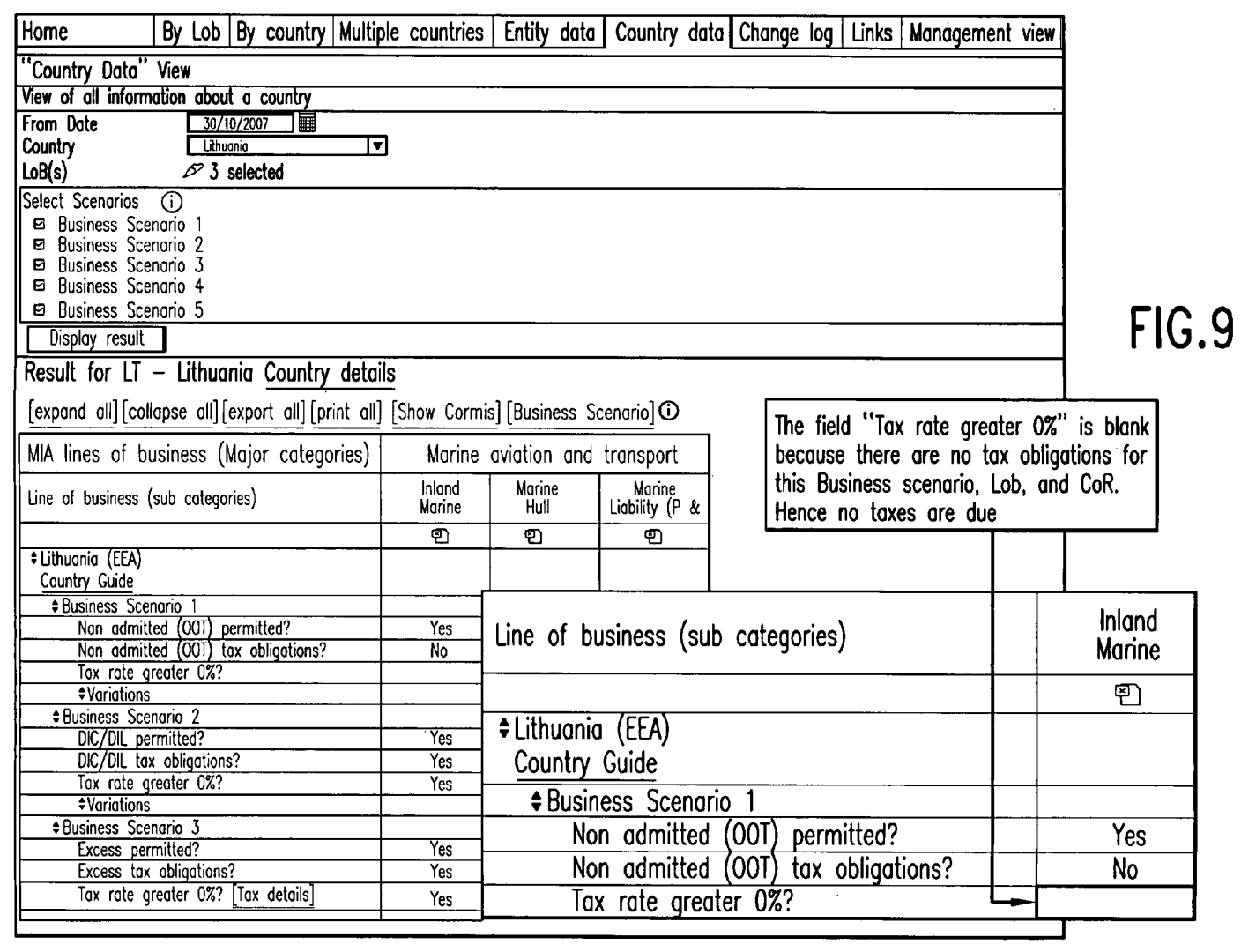

Finally, if the user selects Country Data View (at Step 202), the method proceeds to display a Country Data Home Screen (Step 250) (See FIG. 9). From the Country Data Home Screen, the user can select any country in the database (e.g., database 112), from a 'drop-down' menu or other such means (Step 251), then select a date (Step 252), then select one or more line of business (Step 253), then select one or more Business Scenarios via a check box (Step 254), then select a command button (e.g., "Display result") to display the information for that country, line of business, entity and date range (Step 255). As shown in FIG. 9, the Country Data Home Screen shows all relevant information for a particular country, including legal information for each line of business (e.g., Material Damage, Business Interruption, etc.). The Country Data Home Screen also shows tax information, under the heading "Tax rate greater than 0%?". When this field is blank (as shown in the detail view to the right in FIG. 9), it indicates that there are no tax obligations for the particular Business Scenario. The user may continue the above-referenced selection process for any number of different lines of business, navigate to another 'View' type (Step 202), access important documents and links, such as an on-line manual (Step 203), access help and support information (Step 204), view a Change Log (Step 205), enter a Management View (Step 206), or access the Tax Module (Step 207).

Those of ordinary skill in the art will realize that although the above-referenced steps associated with each 'View' are discussed above with reference to being performed in a particular order, such steps can be performed in any order within the scope of the present invention. For example, when selecting a LoB View, the user may first enter a date (Step 214), and then enter an area (Step 212), so on and so forth.

Figure 10:
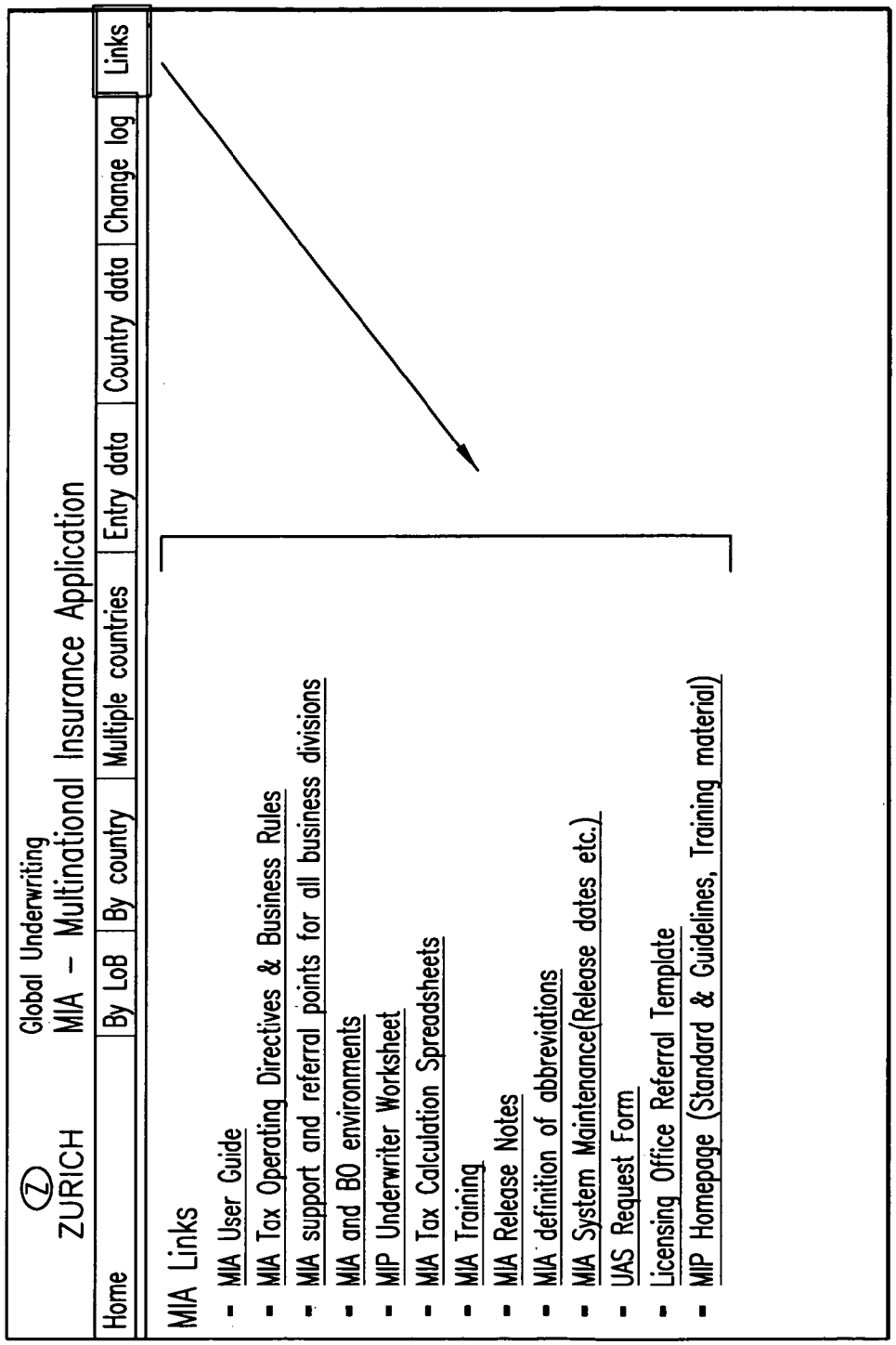
FIG. 10 is a screen shot showing a Links Home Screen according to a first exemplary embodiment of the present invention.

Besides accessing 'Views,' the user can also access important links and an on-line manual from the Home Screen (Step 203). For example, to access this information the user could select a hyperlink or command button on the Home Screen (e.g., the button labeled "Links" in FIG. 4) to display a Links Home Screen (See FIG. 10). The Links Home Screen may include one or more hyperlinks or command buttons which provide access to further information. For example, the Links Home Page may includes links to: a User Guide, Tax Operating Directives & Business Rules, Underwriting Worksheets, Tax Calculation Spreadsheets, Training Information, Release Notes, Definitions of Abbreviations, System Maintenance Information, Licensing Office Referral Template, and/or Standards & Guidelines.

Figure 21:
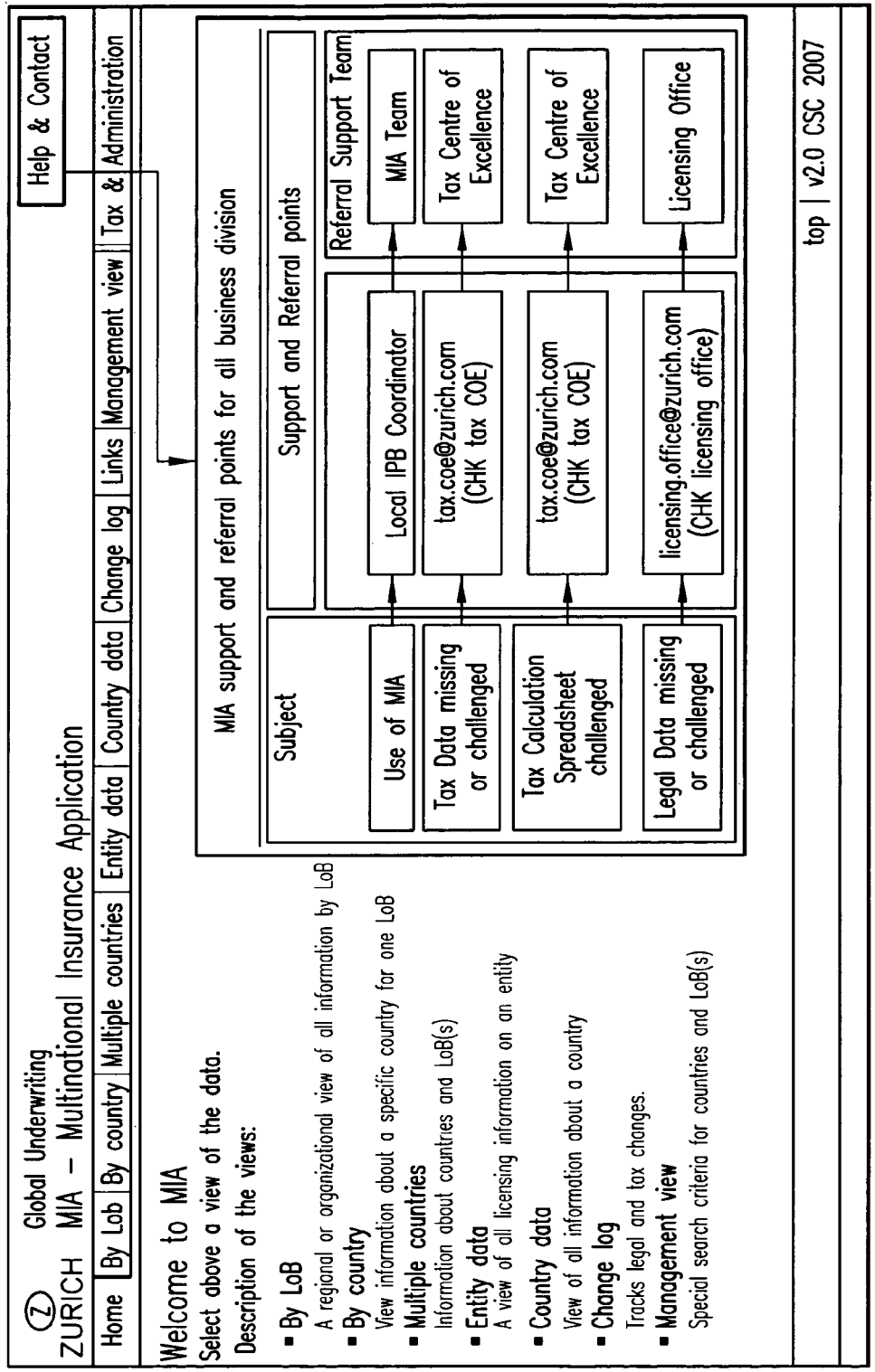
FIG. 21 is a screen shot showing a Help Home Screen according to a first exemplary embodiment of the present invention.

The user can also access help and support information from the Home Screen (Step 204). For example, to access this information the user could select a hyperlink or command button on the Home Screen (e.g., the hyperlink labeled "Help & Contact" in FIG. 4) to display a Help Home Screen (not shown; shown below for Tax Home Screen as FIG. 21). Preferably, the Help Home Screen comprises a separate window which is overlaid on the Home Screen (or other screen). As is well known in the art, the Help Home Screen may include a directory of help areas, and/or a search dialog box for locating help on a particular topic.

Additionally, the user can access a 'Change Log' from the Home Screen (Step 205). For example, to access this information the user could select a hyperlink or command button on the Home Screen (e.g., the hyperlink labeled "Change Log" in FIG. 4) to display a Change Log Home Screen (See FIG. 11). The Change Log Home screen allows the user to easily track changes in country, license, entity and tax information in a particular date range. For example, from the Change Log Home Screen the user can a date range and various filters (i.e., by country, by license, by entity) in order to determine changes. Once the user has selected a date range and filter(s), the user selects a command button (e.g., "Display Result") to display the information.

The user can also access various management functions from the Home Screen through a Management View (Step 206). For example, to access this information the user could select a hyperlink or command button on the Home Screen (e.g., the hyperlink labeled "MGT" in FIG. 4) to display a Management Home Screen (See FIG. 12). The Management Home screen allows the user to easily access country and line of business information, according to varying business scenarios. For example, from the Management Home Screen the user can enter a date, enter one or more lines of business, enter one or more countries, enter one or more business scenarios, and then selects a command button (e.g., "Display Result") to display the results. As noted above, the business scenarios may comprise recurring insurance situations, and may be created by the insurer. Optionally, the user may select a box which displays entity information with the results (e.g., the "Entity Data" click-box). Also optionally, the user may select one or more boxes within each business scenario which place further restrictions on the associated business scenario (e.g., the "permitted" "not permitted" and "exception" check boxes).

Figure 3:
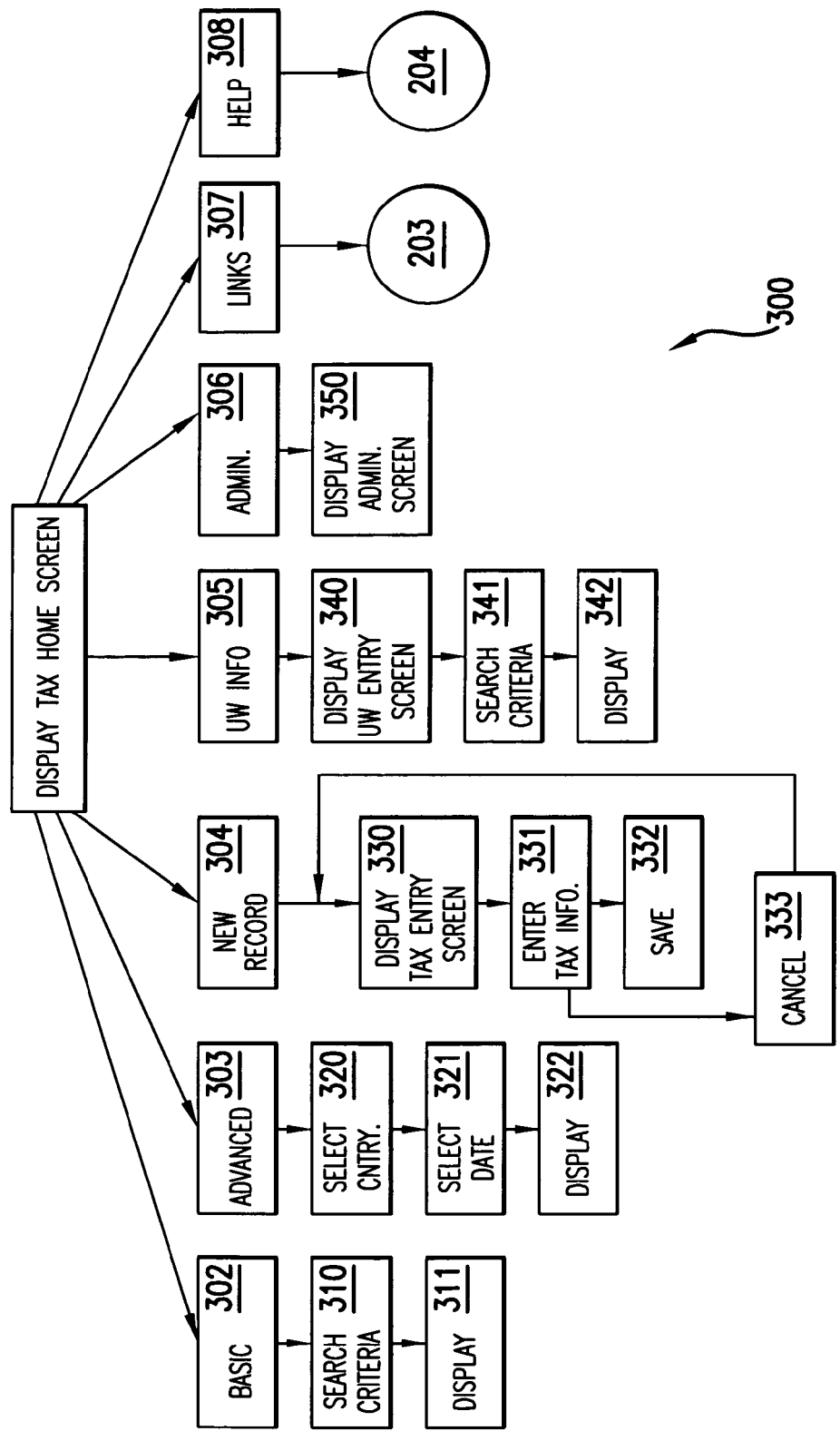
FIG. 3 is a flow chart showing a method for viewing and editing tax information which is part of the method for monitoring insurance shown in FIG. 2.
Figure 13:
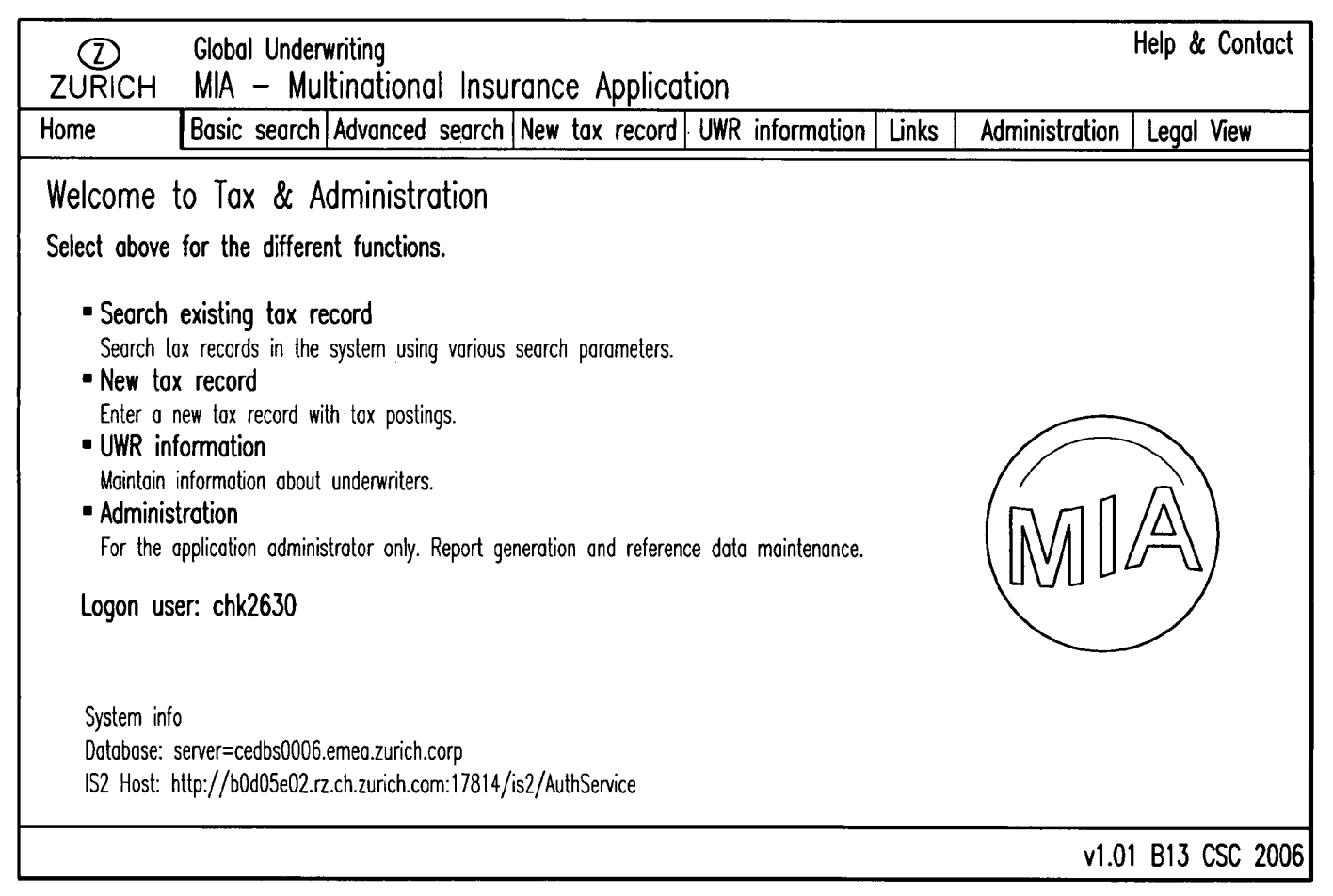

FIG. 3 shows a method for viewing and editing tax information 300 which is part of the method for monitoring insurance 200 according to the first exemplary embodiment of the present invention. As noted above, the user can also access a Tax Module from the Home Screen by selecting a command button which may be entitled, for example, "Tax & Administration" (Step 207). If this command button is selected, and the user has the proper authorization and credentials, a Tax Home Screen is presented to the user (Step 301) (See FIG. 13). The user may be authorized to view the Tax Home Screen by, for example, presenting the user with text boxes into which the user would insert a particular 'logon ID' and 'password,' as is well known to those of ordinary skill in the art. From the Tax Home Screen, users can select to: (1) perform a basic search (Step 302), (2) perform an advanced search (Step 303), (3) create a new Tax Record (Step 304), (4) view underwriter information (Step 305), (5) perform administrative tasks (Step 306), (6) access useful links and information (Step 307), (7) access help and support information (Step 308), or (8) return to the Home Screen (Step 301). Many of the different portions of the method 300 which are available from the Tax Home Screen operate on "Tax Records" and "Tax Postings." "Tax Records" comprise the data set required to compile a Tax Report, and they evidence the taxes relating to one insurance agreement, and a single country of risk. Within a country of risk, more than one tax type can be levied, and such different tax types are referred to as "Tax Postings." Each will be explained in further detail below.

Figure 14:
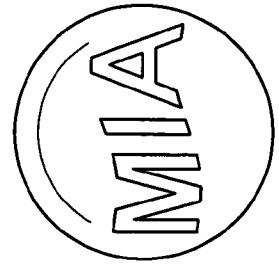
FIG. 14 is a screen shot showing the Tax Home Screen of FIG. 13 with message indicators.

Optionally, the Tax Home Screen may include a message indicator which may notify the user of pending Tax Records (See FIG. 14). In the exemplary embodiment, only Underwriter users receive messages regarding pending Tax Records at the Tax Home Screen, because they are the only users authorized to edit Tax Records. For example, the message may indicate that the Underwriter user has "4 Tax Record(s) pending" meaning the user has previously (within a specified time period) created or edited at least four (4) Tax Records, and did not finalize the Tax Record(s). Changes may be saved by selecting a drop-down-menu or hyperlink on the Tax Record Entry Screen (See FIG. 19), which changes the status of the Tax Record from, for example, "Pending" to "Bound." The Underwriter user may receive such messages for Tax Records created or updated within any specific time period, but in the exemplary embodiment the time period is thirty (30) days.

As shown in FIG. 14, the Tax Home Screen may also include a message indicator which notifies the user of Tax Records for which there is a premium due. In the exemplary embodiment, only Accountant users receive premium due messages at the Tax Home Screen because they are the only users authorized to record a "date of cash receipt". For example, the message may indicate that the user has "661 Tax Record(s) with outstanding premiums" meaning the user should take action to ensure the premium is received from the insured, or to ensure the premium has been recorded as received, if not already recorded.

As noted above, the method for viewing and editing tax information 300 works upon assigned security user rights. If a single DIC/DIL policy covers seven (7) different countries, then 7 separate Tax Records should be created and stored. Additionally, each Tax Record should apply to a single coverage period. Further, the method 300 involves several 'validation' steps (discussed below), which prevent Tax Records from being created or updated such that coverage is issued 'out of territory' (OOT) where OOT coverage is prohibited. The method 300 may also permit the 'locking' of Tax Records, such that they may not be altered or deleted. For example, the method 300 may permit authorized users to set the status of one or more Tax Records as: (1) "Pending" (meaning the Tax Record has been created or edited, but not finalized), (2) "Bound" (meaning the Tax Record has been created or edited, and is ready to get reported), (3) "Locked" (meaning a report on the Tax Record has been issued, and thus the record cannot be altered in any way) or (4) "Completed" (meaning that one or more Tax Postings related to the Tax Record have been reported, and no further reports will be issued). If a Tax Record which has been "Locked" or "Completed" requires alteration, the method 300 preferably creates a new (unblocked) Tax Record for the alteration which is linked to the original Tax Record. The process for creating Tax Records, adding Tax Postings to Tax Records, and reversing Tax Postings, will be explained in more detail below.

Figure 15:
FIG. 15 is a screen shot showing a Basic Search Screen according to a first exemplary embodiment of the present invention.

If the user selects to perform a basic search, the method proceeds to display a Basic Search Screen (See FIG. 15). From the Basic Search Screen, the user can search stored Tax Records according to a variety of parameters (Step 310). For example, such parameters may include (but are not limited to): Tax Record ID, Country of Risk, Entity Country, Legal Entity, Local Contract ID, Program ID, Underwriter Name, Line of Business (LoB), Tax Record Status, and/or Dates. Once the user has selected search parameters, the user selects a command button (e.g., "Search") to display the search results (Step 311). If the user only enters the Tax Record ID, a 'quick' search will be performed. The results of such a 'quick' search are shown in FIG. 16 for a Tax Record with Tax Record ID "2311."

FIG. 17 shows an exemplary Tax Record Screen which has been found using the Basic Search Screen described above (e.g., the Tax Record with Tax Record ID '2311). Once the Tax Record is found using the Basic Search Screen, it may be manipulated in various ways. For example, the Tax Record may be edited, copied, or deleted. Such actions may be accomplished through the selection of one or more command buttons or hyperlinks on the Tax Record Screen (e.g., the command buttons "Edit," "Copy Record," "Copy Installment" and "Delete Record" in FIG. 17). The Tax Record may also be printed through selection of one or more command buttons or hyperlinks (e.g., the hyperlink "[Print]" shown in FIG. 17). Additionally, Tax Postings may be made to the Tax Record or 'reversed' from the Tax Record on the Tax Record Screen, such as for example, by selecting one or more command buttons or hyperlinks on the Tax Record Screen (e.g., the command buttons "Add Posting" and "Reverse Posting," not shown in FIG. 17 but which are made available when one or more hyperlinks or commands buttons are selected, such as when the user selects the "Edit" command button shown in FIG. 17). A Tax Posting may indicate various conditions related to the Tax Record, such as when a premium statement has been issued, or when a premium has been paid. As with Tax Records, Tax Postings may be assigned one of four (4) exemplary status indicators: (1) "Pending" (meaning the Tax Posting has been created or edited, but not finalized), (2) "Bound" (meaning the Tax Posting has been created or edited, and is ready to get reported), (3) "Reported" (meaning a report on the Tax Posting(s) has been issued, and thus the Tax Posting(s) cannot be altered in any way) or (4) "Completed" (meaning that one or more Tax Postings have been reported, and no further reports will be issued).

A status indication is preferably maintained at Tax Record level, as well as at the Tax Posting level. Some dependencies exist between status at the Tax Record level and Tax Posting level. Some status changes are made by a user; and some are triggered by the system (e.g., client-server computer system 100, or some portion thereof) as a consequence of another process. Not all combinations of status changes are allowed. Status changes have to follow a given sequence (as discussed below). All actions which a user can perform (edit, pose, update etc.), are dependent of the current status of the Tax Record or Tax Posting. Status indicators for Tax Records and Tax Postings include the following:

Tax Records
Status: "Pending"
Initial status of a Tax Record. The status of a Tax Record may also be changed from "Bound" (explained below) to "Pending," and vice versa. Status can only be changed to "Bound" from "Pending" status.
This is the status in which the underwriter enters data and changes data. It tells the system (e.g., client-server computer system 100, or some portion thereof) that the user is still working with the data and that the Tax Record is not yet ready for further system processing (e.g. reporting).
Status: "Bound"
As noted above, the status of a Tax Record may be changed from "Pending" to "Bound" and vice versa by the user. From the "Bound" status, the system (independent of the user) can change to "Locked" or "Completed" status (both explained below).
This is the status in which the underwriter has finished data entry and the Tax Record is ready for further system processing (e.g. reporting).
Status: "Locked"
As noted above, only the system (not the user) can change status from "Bound" to "Locked".
This is the status in which a Tax Record is set by the system as soon as one of its associated Tax Postings has been reported on a monthly tax report. (See also Tax Posting status "Reported"). In this status the underwriter is no longer allowed to change any significant data, as the Tax Record then would no longer correspond to what has been reported. A Tax Record stays in the status "Locked" as long as one or more if its associated Tax Postings has not yet been reported.
Status: "Completed"
As noted above, only the system (not the user) can change status from "Locked" to "Completed". Once a Tax Record has a "Completed" status, its status can no longer be changed.
This is the status in which all Tax Postings associated with the Tax Record have been reported. Preferably, no further changes are necessary for a Tax Record with this status, and no reports will use this Tax Record from this point forward.
Tax Postings
Status: "Pending"
Initial status of a Tax Posting. The status of a Tax Posting may also be changed from "Pending" to "Bound" only by the system. In particular, status is changed to "Bound" by the system when the user changes the status of the associated Tax Record from "Pending" to "Bound".
Status: "Bound"

Figure 18:
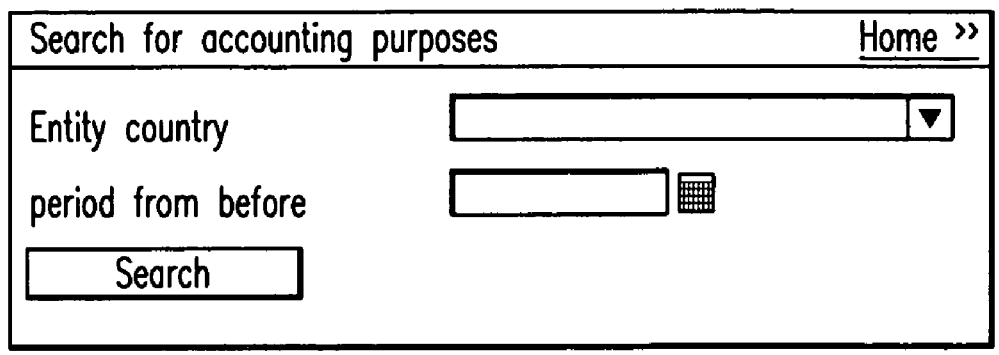
FIG. 18 is a screen shot showing an Advanced Search Screen according to a first exemplary embodiment of the present invention.

As noted above, only the system can change the status of a Tax Posting from "Pending" to "Bound." The system can also change status from "Bound" to "Pending", "Reported" or "Completed". In particular, status is changed from "Bound" to "Reported" by the system when the user reports the Tax Posting on a monthly tax report. The system cannot change the status of a Tax Posting directly from "Bound" to "Completed" without first changing to "Reported."
Status: "Reported"
As noted above, the status of a Tax Posting is changed from "Bound" to "Reported" as soon as the Tax Posting has been reported on a monthly tax report. In this status the Tax Posting is frozen. The underwriter is no longer allowed to change any data, as the Tax Posting then would no longer correspond to what has been reported. A Tax Posting stays in the status "Reported" as long as one or more of the other Tax Postings belonging to the same Tax Record has not yet been reported (i.e., they are still in status "Bound"). Once all of the Tax Postings of a particular Tax Record have been reported, status of the Tax Posting may be changed from "Reported" to "Completed" by the system.
Status: "Completed"
As noted above, the status of a Tax Posting is changed from "Reported" to "Completed" as soon as all of the Tax Postings of a particular Tax Record have been reported. Once a Tax Posting is in a "Completed" status, its status cannot be changed. Preferably, no further changes are necessary for a Tax Posting with this status, and no reports will use this Tax Posting from this point forward If the user selects to perform an advanced search, the method proceeds to display an Advanced Search Screen (See FIG. 18). From the Advanced Search Screen, the user can search for a Tax Record with the status "Bound" and "Locked" related to an Entity Country. Such a search relates to an accounting model to determine 'cash received,' or a combination of 'cash received' and 'premium written-cash outstanding.' The "Advanced Search" may be used by Accountant users to get an overview of outstanding funds. The user begins by entering a country of interest (Step 320). Then, the user selects a date range (Step 321). Once the user has selected a country and date, the user selects a command button (e.g., "Search") to display the search results (Step 322).

If the user selects to create a new Tax Record, the method 300 proceeds to display a Tax Record Entry Screen (Step 330) (See FIG. 19). From the Tax Record Entry Screen, the user can enter all relevant information for a new Tax Record (Step 331). Once the information is entered, the user can save the Tax Record by selecting a command button (e.g., "Save") (Step 332). When saved, the tax information is assigned a unique Tax Record ID, which may be used to identify the Tax Record. Alternately, if the user chooses not to save the information entered, he may cancel and start over by selecting a command button (e.g., "Cancel") (Step 333). The user can enter a variety of information into the Tax Record upon creation including, but not limited to Entity Country, Legal Entity, Business Unit, Local Contract ID, Program ID, Producing Country, Producing Entity, IPS Contract ID, Customer, Dates, Line of Business (LoB), policies written under Freedom of Service (FOS) rules, Business Scenario, Record Type, Underwriter Information, Tax Record Status, Country of Risk, Location Information, Contract Currency, and/or Premium Information.

If the user selects to view underwriter information, the method proceeds to display an Underwriter Screen (Step 340) (See FIG. 20). From the Underwriter Screen, the user can search for an underwriter by various criteria. For example, the user can provide certain information concerning the underwriter (Step 341), and then select a command button to display the results of the search criteria (Step 342). Exemplary search criteria include: (1) Underwriter User ID (also know as UAS), (2) Underwriter Country, (3) Underwriter Name, (4) Underwriter Email Address, (5) Underwriter Telephone Number, (6) Underwriter Fax Number, and (7) Underwriter Company.

Figure 24:
FIG. 24 is a screen shot showing an Administration Screen according to a first exemplary embodiment of the present invention.

Finally, if the user selects to perform administrative tasks, the method proceeds to display an Administration Screen (See FIG. 24). From the Administration Screen, the user can modify all reference data (e.g., legal and tax reference data, Licenses, Business Scenarios, exceptions, link administration, load exchange rates, etc.) stored in the database (e.g., database 112).

Besides accessing tax information, the user can also access important links and an on-line manual from the Tax Home Screen. For example, to access this information the user could select a hyperlink or command button on the Tax Home Screen (e.g., the button labeled "Links" in FIG. 13) to display the Links Home Screen described above (See, FIG. 10). The user can also access help and support information from the Tax Home Screen. For example, to access this information the user could select a hyperlink or command button on the Tax Home Screen (e.g., the hyperlink labeled "Help & Contact" in FIG. 13) to display the Help Home Screen described above (See FIG. 21).

Figure 22:
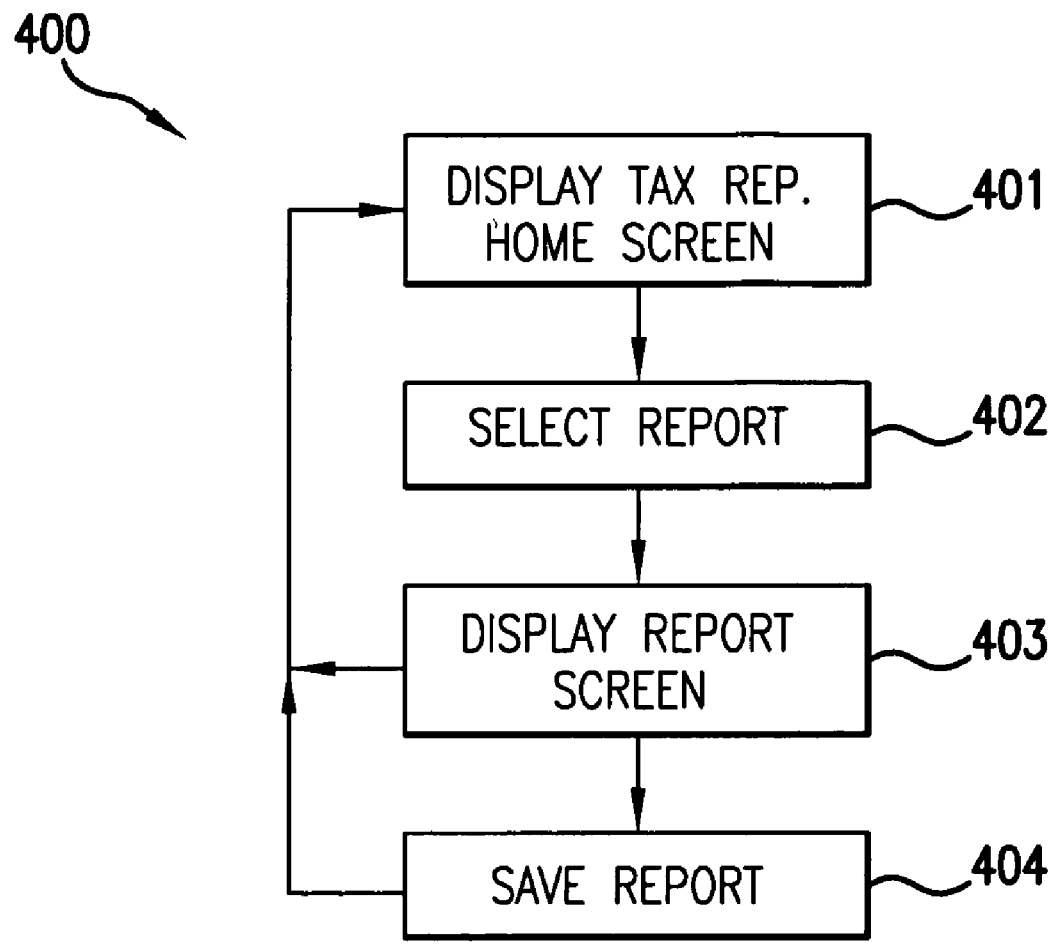
FIG. 22 is a flow chart showing a method for viewing and generating tax reports according to a first exemplary embodiment of the present invention.
Figure 23:
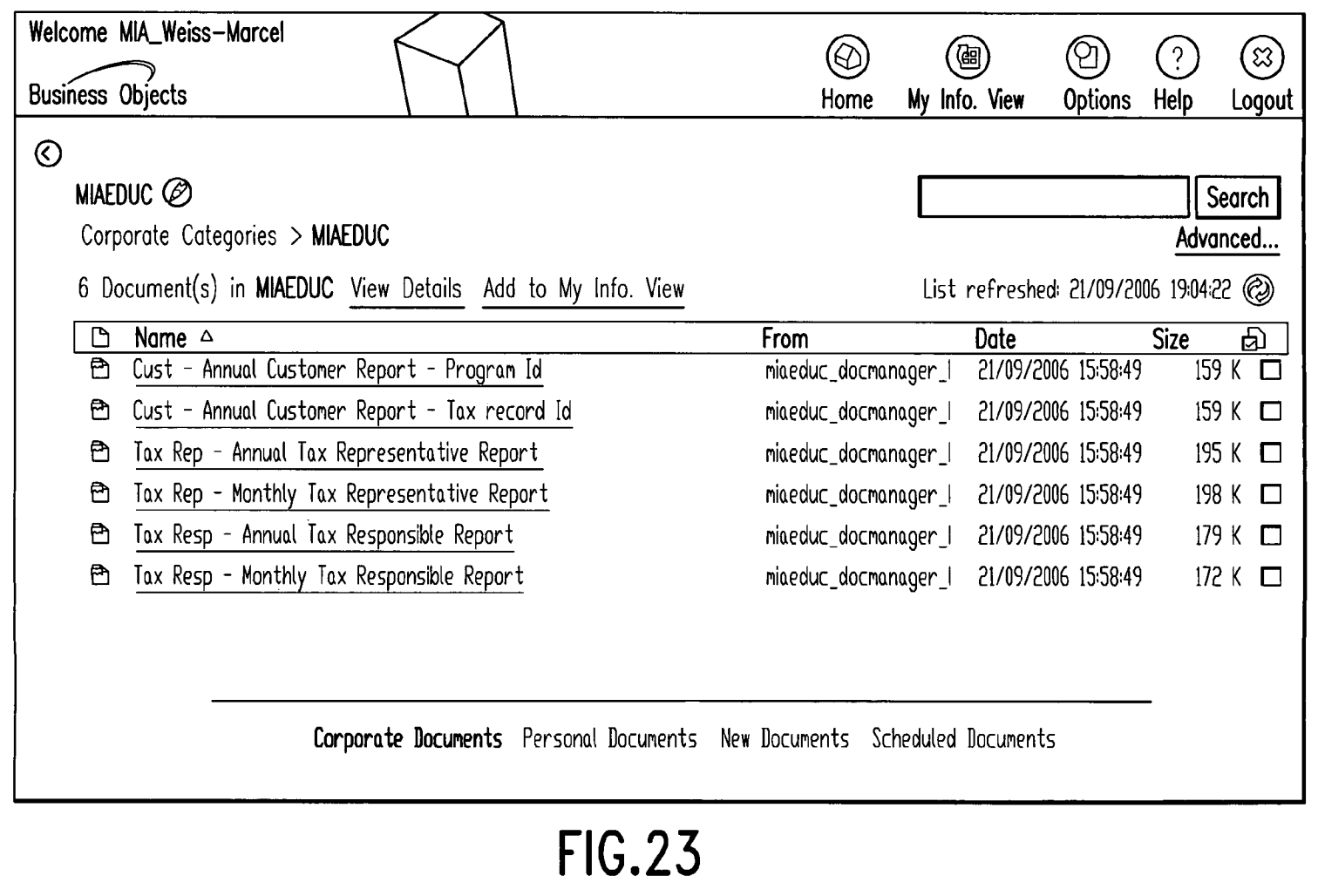

As a complement to the method for monitoring insurance 200 described above, the present invention may also include a method for viewing and generating tax reports 400 which includes a first step of logging on to a specific website by, for example, entering a specific URL (e.g., https://z-portal.zurich.com/borpadhoc/?login) in one of the browser programs 124 of one of the user computers 120 so that a Tax Report Home Screen (See FIGS. 22 and 23) is displayed (step 401). The method 400 may be implemented by additional program code of the above-described program module 113 which implements the method 200, or it may comprise a separate program module 113' with separate program code. Preferably, access to the Tax Report Home Screen is protected, such that a user must enter a particular 'logon ID' and 'password,' as is well known to those of ordinary skill in the art. From the Tax Report Home Screen, the user may select a particular report to view by selecting, for example, a command button or hyperlink associated with the report (step 402). For example, FIG. 23 shows six (6) available reports: (1) Annual Customer Report (Program ID), (2) Annual Customer Report (Tax Record ID), (3) Annual Tax Representative Report, (4) Monthly Tax Representative Report, (5) Annual Tax Responsible Report, and (6) Monthly Tax Responsible Report. The Tax Report Home Screen may also show the author information for each report, the date of creation (or last edit), and the size of the file. Once a report is selected, it may be displayed by, for example, selection of the command button or hyperlink associated with it. Such selection displays a Report Screen for the particular report (not shown) (Step 403). From the Report Screen, the user can save the report in various formats (Microsoft Excel®, Adobe® PDF, etc.) and to various locations (e.g., disk, internal memory, external memory, etc.) (Step 404), or return to the Tax Report Home Screen to view another report. The user can select the necessary Tax Report by using search criteria (e.g., Entity Country or Tax Report Month). Based on the recorded data on different Tax Reports, the user transfers or receives the taxes due.

Although the present invention has been described above in connection with a system and method for monitoring insurance across multiple countries, those of ordinary skill in the art will realize that the present invention is not so limited. The present invention has application where insurers and insureds are not only disposed in different countries, but also in different counties, in different states (e.g., Pennsylvania and Delaware), in different jurisdictions, and in any other geographic or legal areas or regions known to those of ordinary skill in the art.

Although the present invention has been described above in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. A computer-implemented method for monitoring insurance, comprising the steps of:
    creating on a computer system a plurality of tax records, each tax record corresponding to one or more insurance agreements and specifying at least one country of risk and at least one country of an insurer;
    calculating on the computer system at least one tax rate for each of the plurality of tax records;
    storing the plurality of tax records and tax rates in a database coupled to the computer system; and,
    permitting the display of at least one of the plurality of tax records on a first computer of the computer system according to specific presentation criteria, wherein the specific presentation criteria comprises one selected from the group consisting of: line of insurance business, and geographic region.

2. The computer-implemented method of claim 1, wherein the specific presentation criteria comprises one selected from the group consisting of: line of insurance business, and country.

3. The computer-implemented method of claim 1, wherein the specific presentation criteria comprises one selected from the group consisting of: line of insurance business, insurance business scenario and country.

4. The computer-implemented method of claim 1, wherein the specific presentation criteria comprises one selected from the group consisting of: insured entity information, and date.

5. The computer-implemented method of claim 1, wherein the specific presentation criteria comprises one selected from the group consisting of: country and date.

6. A computer-implemented method for monitoring insurance, comprising the steps of:
    storing a plurality of tax records in a database of a computer system, each tax record corresponding to one or more insurance agreements;
    permitting the display of at least one of the plurality of tax records on a first computer of the computer system,
    assigning on the computer system a specific clearance level to each person who views or edits the plurality of tax records; and,
    permitting only those persons who are authorized by their clearance level to edit one or more of the plurality of tax records using the computer system
    wherein each of the plurality of tax records specify at least a country of risk and a country of an insurer.

7. The computer-implemented method of claim 1, comprising the further step of:
    presenting information regarding one or more of the plurality of tax records on the first computer of the computer system, wherein the information presented comprises information regarding a premium value associated the one or more tax records.

8. The computer-implemented method of claim 1, comprising the further steps of:
  permitting the searching of the plurality of tax records on the computer system according to specific search criteria; and,
  displaying one or more tax records of the plurality of tax records on the first computer of the computer system which match the specific search criteria.

9. The computer-implemented method of claim 8, wherein the specific search criteria comprises a tax record identification number.

10. The computer-implemented method of claim 1, wherein the step of permitting the display of at least one of the plurality of tax records on a first computer of the computer system comprises permitting the display of a plurality of tax records associated with a particular insured party on the first computer of the computer system.

11. A computer system comprising:
  at least one server computer; and,
  at least one first client computer coupled to the at least one server computer through a network;
  wherein the at least one server computer includes at least one program stored thereon, said at least one program performing the following steps:
  permitting the creation of a plurality of tax records, each tax record corresponding to one or more insurance agreements and specifying at least one country of risk and at least one country of an insurer;
  calculating at least one tax rate for each of the plurality of tax records;
  storing the plurality of tax records in a database; and,
  permitting the display of at least one of the plurality of tax records, along with the associated tax rate.

12. The computer system of claim 11, wherein said at least one program performs the further step of:
  presenting information regarding one or more of the plurality of tax records, wherein the information presented comprises information regarding a premium value associated the one or more tax records.

13. A computer readable medium having embodied therein a computer program for processing by a machine, the computer program comprising:
  a first code segment for permitting the creation of a plurality of tax records, each tax record corresponding to one or more insurance agreements and specifying at least one country of risk and at least one country of an insurer;
  a second code segment for calculating at least one tax rate for each of the plurality of tax records;
  a third code segment for permitting the storage of the plurality of tax records in a database; and,
  a fourth code segment for permitting the display of at least one of the plurality of tax records, along with the associated tax rate.

14. The computer readable medium of claim 13, the computer program further comprising:
  at least one fifth code segment for permitting the presentation of information regarding one or more of the plurality of tax records, wherein the information presented comprises information regarding a premium value associated with the one or more tax records.

15. A computer-implemented method for monitoring insurance, comprising the steps of:
  permitting an underwriter to create at least one computerized tax record using a first computer of a computer system, wherein the computerized tax record corresponds to at least one insurance agreement, and specifies at least one country of risk and at least one country of an insurer;
  calculating at least one tax rate for the at least one computerized tax record on the computer system;
  storing the at least one computerized tax record, along with the tax rate, in a database coupled to the computer system; and,
  permitting the underwriter to display the at least one computerized tax record and tax rate on any computer within the computer system.

16. The computer-implemented method of claim 15, comprising the further step of:
  paying taxes due in the at least one country of risk according to the tax rate using the computer system.

* * * * *